(12) United States Patent
Barak et al.

(10) Patent No.: US 12,470,442 B2
(45) Date of Patent: Nov. 11, 2025

(54) TECHNIQUES FOR DYNAMIC PRE-EQUALIZATION SWITCHING

(71) Applicant: QUALCOMM Incorporated, San Diego, CA (US)

(72) Inventors: Tom Barak, Rehovot (IL); Assaf Touboul, Netanya (IL); Michael Levitsky, Rehovot (IL); Daniel Paz, Atlit (IL); Alexander Sverdlov, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 18/320,017

(22) Filed: May 18, 2023

(65) Prior Publication Data

US 2024/0388478 A1    Nov. 21, 2024

(51) Int. Cl.
*H04L 25/03* (2006.01)
*H04B 17/336* (2015.01)
*H04L 5/00* (2006.01)

(52) U.S. Cl.
CPC ..... *H04L 25/03891* (2013.01); *H04B 17/336* (2015.01); *H04L 5/0048* (2013.01)

(58) Field of Classification Search
CPC ............ H04L 25/03891; H04L 5/0048; H04B 17/336
See application file for complete search history.

(56) References Cited

U.S. PATENT DOCUMENTS

| | | | |
|---|---|---|---|
| 10,069,660 B1 * | 9/2018 | Sun | H04L 25/03146 |
| 2013/0223506 A1 | 8/2013 | Kolze | |
| 2016/0204822 A1 | 7/2016 | Yu et al. | |
| 2021/0119682 A1 | 4/2021 | Gutman et al. | |
| 2022/0182271 A1 * | 6/2022 | Shin | H04L 27/2639 |
| 2022/0231890 A1 * | 7/2022 | Horn | H04L 25/03343 |

FOREIGN PATENT DOCUMENTS

WO    WO-2013013407 A1    1/2013

OTHER PUBLICATIONS

International Search Report and Written Opinion—PCT/US2024/022775—ISA/EPO—Jul. 19, 2024 (2302769WO).

* cited by examiner

*Primary Examiner* — Duc C Ho
(74) *Attorney, Agent, or Firm* — Holland & Hart LLP

(57) ABSTRACT

Methods, systems, and devices for wireless communications are described. In some examples, the first wireless device may transmit, to a second wireless device, a control message indicating a set of pre-equalization transmission schemes supported by the first wireless device for receipt of messaging pre-equalized by the second wireless device. The first wireless device may transmit a measurement report that indicates a measurement of a wireless channel between the first wireless device and the second wireless device, where the measurement may be a signal-to-interference and noise (SINR) measurement. The first wireless device may receive a control signal indicative of a first pre-equalization transmission scheme to be used by the second wireless device for pre-equalization based at least in part on the set of pre-equalization transmission schemes and the measurement. The first wireless device may receive, via the wireless channel, a downlink message pre-equalized in accordance with the first pre-equalization transmission scheme.

30 Claims, 14 Drawing Sheets

Control Signal  Control Message

Downlink Message  Measurement Report

TECHNIQUES FOR DYNAMIC PRE-EQUALIZATION SWITCHING

FIELD OF TECHNOLOGY

The following relates to wireless communications, including techniques for dynamic pre-equalization switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for dynamic pre-equalization switching. For example, the described techniques provide for a first wireless device (e.g., an extended reality (XR) device) to receive one or more downlink messages that have been pre-equalized by a second wireless device (e.g., a user equipment (UE)), resulting in reduced processing and reduced power consumption at the first wireless device.

A method for wireless communications at a first wireless device is described. The method may include transmitting a control message indicating a set of pre-equalization transmission schemes supported by the first wireless device for receipt of messaging pre-equalized by a second wireless device for transmission to the first wireless device, transmitting a measurement report indicating a measurement of a wireless channel between the first wireless device and the second wireless device, receiving a control signal indicative of a first pre-equalization transmission scheme to be used by the second wireless device for pre-equalization based on the set of pre-equalization transmission schemes and the measurement, and receiving, via the wireless channel, one or more downlink messages pre-equalized in accordance with the first pre-equalization transmission scheme.

An apparatus for wireless communications at a first wireless device is described. The apparatus may include one or more processors, one or more memories coupled with the one or more processors, and instructions stored in the one or more memories. The instructions may be executable by the one or more processors to cause the apparatus to transmit a control message indicating a set of pre-equalization transmission schemes supported by the first wireless device for receipt of messaging pre-equalized by a second wireless device for transmission to the first wireless device, transmit a measurement report indicating a measurement of a wireless channel between the first wireless device and the second wireless device, receive a control signal indicative of a first pre-equalization transmission scheme to be used by the second wireless device for pre-equalization based on the set of pre-equalization transmission schemes and the measurement, and receive, via the wireless channel, one or more downlink messages pre-equalized in accordance with the first pre-equalization transmission scheme.

Another apparatus for wireless communications at a first wireless device is described. The apparatus may include means for transmitting a control message indicating a set of pre-equalization transmission schemes supported by the first wireless device for receipt of messaging pre-equalized by a second wireless device for transmission to the first wireless device, means for transmitting a measurement report indicating a measurement of a wireless channel between the first wireless device and the second wireless device, means for receiving a control signal indicative of a first pre-equalization transmission scheme to be used by the second wireless device for pre-equalization based on the set of pre-equalization transmission schemes and the measurement, and means for receiving, via the wireless channel, one or more downlink messages pre-equalized in accordance with the first pre-equalization transmission scheme.

A non-transitory computer-readable medium storing code for wireless communications at a first wireless device is described. The code may include instructions executable by one or more processors to transmit a control message indicating a set of pre-equalization transmission schemes supported by the first wireless device for receipt of messaging pre-equalized by a second wireless device for transmission to the first wireless device, transmit a measurement report indicating a measurement of a wireless channel between the first wireless device and the second wireless device, receive a control signal indicative of a first pre-equalization transmission scheme to be used by the second wireless device for pre-equalization based on the set of pre-equalization transmission schemes and the measurement, and receive, via the wireless channel, one or more downlink messages pre-equalized in accordance with the first pre-equalization transmission scheme.

Some examples of the method, apparatuses, and non-transitory computer-readable medium described herein may further include operations, features, means, or instructions for receiving, as part of the control signal, an indication of a first waveform of the one or more downlink messages, where the control signal indicates the first pre-equalization transmission scheme based on the first waveform of the one or more downlink messages.

Some examples of the method, apparatuses, and non-transitory computer-readable medium described herein may further include operations, features, means, or instructions for transmitting, as part of the measurement report, an indication of a channel characteristic of the wireless channel between the first wireless device and the second wireless device, where the control signal indicates the first pre-equalization transmission scheme based on the channel characteristic.

Some examples of the method, apparatuses, and non-transitory computer-readable medium described herein may further include operations, features, means, or instructions for receiving a second control signal indicating that pre-equalization for one or more second downlink messages may be disabled based on at least one of a latency associated with channel measurement reporting satisfying a latency threshold or a quantity of unsuccessful transmissions between the first wireless device and the second wireless device satisfying a quantity threshold.

Some examples of the method, apparatuses, and non-transitory computer-readable medium described herein may further include operations, features, means, or instructions for receiving, using channel equalization, the one or more second downlink messages based on the second control signal.

Some examples of the method, apparatuses, and non-transitory computer-readable medium described herein may further include operations, features, means, or instructions for receiving, as part of the control signal, an indication of a power scaling parameter associated with the first pre-equalization transmission scheme, where the one or more downlink messages may be received in accordance with the power scaling parameter.

Some examples of the method, apparatuses, and non-transitory computer-readable medium described herein may further include operations, features, means, or instructions for receiving, as part of the control signal, an indication of one or more parameters associated with the first pre-equalization transmission scheme, where the one or more downlink messages may be received based on the one or more parameters.

In some examples of the method, apparatuses, and non-transitory computer-readable medium described herein, the control signal indicates the first pre-equalization transmission scheme based on the measurement satisfying a measurement threshold, and the measurement threshold may be based on one of a channel characteristic of the wireless channel between the first wireless device and the second wireless device, or a waveform of the one or more downlink messages, or both.

In some examples of the method, apparatuses, and non-transitory computer-readable medium described herein, the first pre-equalization transmission scheme includes at least one of a transmission zero-forcing (Tx-ZF) pre-equalization scheme, a transmission minimum mean squared error (Tx-MMSE) pre-equalization scheme, a Tomlinson-Harashima (THP) ZF (THP-ZF) pre-equalization scheme, or a THP-MMSE pre-equalization scheme.

A method for wireless communications at a second wireless device is described. The method may include receiving a control message indicating a set of pre-equalization transmission schemes supported by a first wireless device for receipt of messaging pre-equalized by the second wireless device for transmission to the first wireless device, receiving a measurement report indicating a measurement of a wireless channel between the first wireless device and the second wireless device, transmitting a control signal indicative of a first pre-equalization transmission scheme to be used by the second wireless device for pre-equalization based on the set of pre-equalization transmission schemes and the measurement, and transmitting, via the wireless channel, one or more downlink messages pre-equalized in accordance with the first pre-equalization transmission scheme.

An apparatus for wireless communications at a second wireless device is described. The apparatus may include one or more processors, one or more memories coupled with the one or more processors, and instructions stored in the one or more memories. The instructions may be executable by the one or more processors to cause the apparatus to receive a control message indicating a set of pre-equalization transmission schemes supported by a first wireless device for receipt of messaging pre-equalized by the second wireless device for transmission to the first wireless device, receive a measurement report indicating a measurement of a wireless channel between the first wireless device and the second wireless device, transmit a control signal indicative of a first pre-equalization transmission scheme to be used by the second wireless device for pre-equalization based on the set of pre-equalization transmission schemes and the measurement, and transmit, via the wireless channel, one or more downlink messages pre-equalized in accordance with the first pre-equalization transmission scheme.

Another apparatus for wireless communications at a second wireless device is described. The apparatus may include means for receiving a control message indicating a set of pre-equalization transmission schemes supported by a first wireless device for receipt of messaging pre-equalized by the second wireless device for transmission to the first wireless device, means for receiving a measurement report indicating a measurement of a wireless channel between the first wireless device and the second wireless device, means for transmitting a control signal indicative of a first pre-equalization transmission scheme to be used by the second wireless device for pre-equalization based on the set of pre-equalization transmission schemes and the measurement, and means for transmitting, via the wireless channel, one or more downlink messages pre-equalized in accordance with the first pre-equalization transmission scheme.

A non-transitory computer-readable medium storing code for wireless communications at a second wireless device is described. The code may include instructions executable by one or more processors to receive a control message indicating a set of pre-equalization transmission schemes supported by a first wireless device for receipt of messaging pre-equalized by the second wireless device for transmission to the first wireless device, receive a measurement report indicating a measurement of a wireless channel between the first wireless device and the second wireless device, transmit a control signal indicative of a first pre-equalization transmission scheme to be used by the second wireless device for pre-equalization based on the set of pre-equalization transmission schemes and the measurement, and transmit, via the wireless channel, one or more downlink messages pre-equalized in accordance with the first pre-equalization transmission scheme.

Some examples of the method, apparatuses, and non-transitory computer-readable medium described herein may further include operations, features, means, or instructions for transmitting, as part of the control signal, an indication of a first waveform of the one or more downlink messages, where the control signal indicates the first pre-equalization transmission scheme based on the first waveform of the one or more downlink messages.

Some examples of the method, apparatuses, and non-transitory computer-readable medium described herein may further include operations, features, means, or instructions for receiving, as part of the measurement report, an indication of a channel characteristic of the wireless channel between the first wireless device and the second wireless device, where the control signal indicates the first pre-equalization transmission scheme based on the channel characteristic.

Some examples of the method, apparatuses, and non-transitory computer-readable medium described herein may further include operations, features, means, or instructions for transmitting a second control signal indicating that pre-equalization for one or more second downlink messages may be disabled based on at least one of a latency associated with channel measurement reporting satisfying a latency threshold or a quantity of unsuccessful transmissions between the first wireless device and the second wireless device satisfying a quantity threshold.

Some examples of the method, apparatuses, and non-transitory computer-readable medium described herein may further include operations, features, means, or instructions for refraining from pre-equalization the one or more second downlink messages based on the second control signal.

Some examples of the method, apparatuses, and non-transitory computer-readable medium described herein may further include operations, features, means, or instructions for transmitting, as part of the control signal, an indication of a power scaling parameter associated with the first pre-equalization transmission scheme, where the one or more downlink messages may be transmitted in accordance with the power scaling parameter.

Some examples of the method, apparatuses, and non-transitory computer-readable medium described herein may further include operations, features, means, or instructions for transmitting, as part of the control signal, an indication of one or more parameters associated with the first pre-equalization transmission scheme, where the one or more downlink messages may be transmitted based on the one or more parameters.

In some examples of the method, apparatuses, and non-transitory computer-readable medium described herein, the control signal indicates the first pre-equalization transmission scheme based on the measurement satisfying a measurement threshold, and the measurement threshold may be based on one of a channel characteristic of the wireless channel between the first wireless device and the second wireless device, or a waveform of the one or more downlink messages, or both.

In some examples of the method, apparatuses, and non-transitory computer-readable medium described herein, the first pre-equalization transmission scheme includes at least one of a Tx-ZF pre-equalization scheme, a Tx-MMSE pre-equalization scheme, a THP-ZF pre-equalization scheme, or a THP-MMSE pre-equalization scheme.

DETAILED DESCRIPTION

Figure 1:
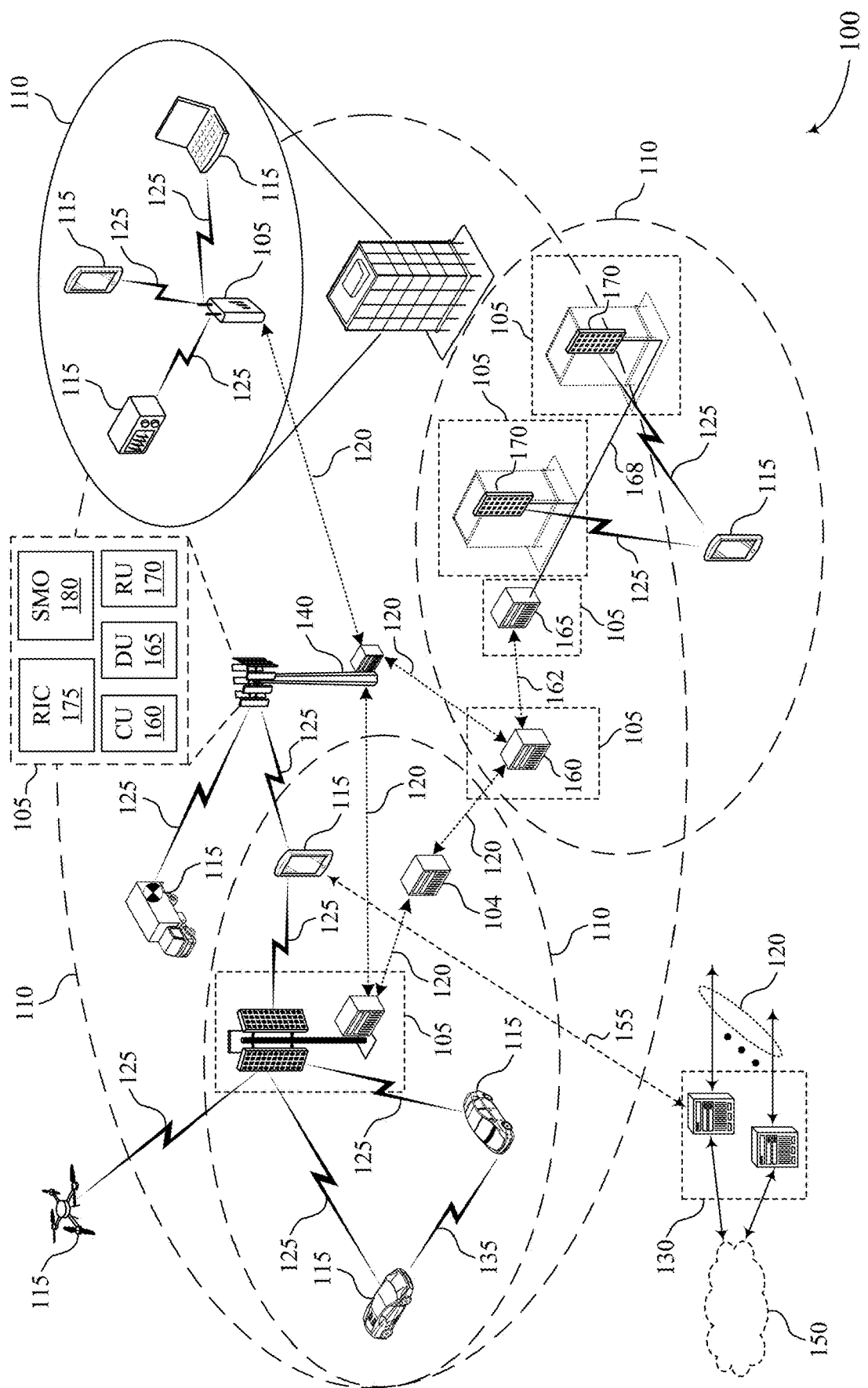
FIG. 1 shows an example of a wireless communications system that supports techniques for dynamic pre-equalization switching in accordance with one or more aspects of the present disclosure.

Some wireless devices (e.g., such as glasses or other wearable devices) of a wireless communications system may implement, or otherwise be intended for, one or more extended reality (XR) applications. In order to be cost effective and functional to users, such wireless devices may have limited processing capabilities, be lightweight, and be associated with a reduced level of power consumption relative to a user equipment (UE) (e.g., such as smartphones, tablets, or the like). In some cases, however, the wireless device may experience increased power consumption due to the relatively high volume of processing involved for XR applications. As such, to accommodate for the capabilities of the wireless device, the processing of the XR applications may be offloaded from being performed at the wireless device to being performed at the UE (e.g., due to the UE having an increased processing capability, battery life, or the like). Such offloading may be desirable across various aspects of the wireless device, including for aspects associated with physical layer signaling and a modem of the wireless device.

The techniques described herein may enable the UE to dynamically select and use various pre-equalization transmission schemes for one or more downlink messages to the wireless device based on a measurement of a wireless channel between the UE and the wireless device. As such, the wireless device may reduce processing and power consumption related to receiver side equalization. For example, a first wireless device (e.g., the XR device) may transmit, to a second wireless device (e.g., the UE), a control message indicating a set of pre-equalization transmission schemes supported by the first wireless device. The first wireless device may also transmit a measurement report indicating a measurement of the wireless channel between the first wireless device and the second wireless device.

In response, the second wireless device may transmit a control signal indicating a first pre-equalization transmission scheme, where the first pre-equalization transmission scheme is selected from the set of pre-equalization transmission schemes based on at least the measurement. For example, each pre-equalization transmission scheme of the set of pre-equalization transmission schemes may reduce the effects of channel noise and interference at various measurement ranges of the wireless channel. As such, the second wireless device may select the first pre-equalization transmission scheme based on at least the measurement of the wireless channel. The second wireless device may pre-equalize one or more downlink messages in accordance with the selected pre-equalization transmission scheme and transmit the one or more downlink messages to the first wireless device.

In this way, the first wireless device may experience reduced processing power and increased power savings. For example, by pre-equalization the one or more downlink messages at the second wireless device, the first wireless device may receive the one or more downlink messages, such that the noise and interference of the channel is reduced (e.g., due to the pre-equalization of the downlink messages at the second wireless device), leading to reduced processing and decoding at the first wireless device. Further, by receiving the measurement of the wireless channel, the second wireless device may select a pre-equalization transmission scheme based on the measurement of the wireless channel, where the selected pre-equalization transmission scheme may be configured for (e.g., optimal for) the measurement range. In this way, the second wireless device may be able to dynamically switch between various pre-equalization transmission schemes based on the measurement, leading to improved coordination between devices and efficient utilization of the pre-equalization transmission schemes.

Aspects of the disclosure are initially described in the context of wireless communications systems. Aspects of the disclosure are further described in the context of pre-equalization diagrams, false log likelihood ratio (LLR) detection and correction diagram, and process flows. Aspects of the disclosure are further illustrated by and described with reference to apparatus diagrams, system diagrams, and flowcharts that relate to techniques for dynamic pre-equalization switching.

FIG. 1 shows an example of a wireless communications system 100 that supports techniques for dynamic pre-equalization switching in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for dynamic pre-equalization switching as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol).

In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless devices (e.g., such as glasses or other wearable devices) of a wireless communications system may implement, or otherwise be intended for, one or more XR applications. In order to be cost effective and functional to users, such wireless devices may have limited processing capabilities, be lightweight, and be associated with a reduced level of power consumption relative to a UE 115 (e.g., such as smartphones, tablets, or the like). In some cases, however, the wireless device may experience increased power consumption due to the relatively high volume of processing involved for XR applications. As such, to accommodate for the capabilities of the wireless device, the processing of the XR applications may be offloaded from being performed at the wireless device to being performed at the UE 115 (e.g., due to the UE 115 having an increased processing capability, battery life, or the like).

That is, the wireless device (e.g., XR glasses) may function as an input/output (I/O) device by shifting, or otherwise moving, the receiving complexity of the wireless device to the UE 115. In one case, the wireless device may experience increased complexity at the modem due to a receiving equalizer (e.g., a component that reduces, or eliminates, channel noise and channel interference that are added to the signals during transmission). As such, in order to reduce the complexity associated with the receiving equalizer at the wireless device, the UE 115 may apply a transmission pre-equalizer, such that the wireless device does not have to perform receiving equalization. As such, pre-equalization transmission schemes (e.g., pre-equalizing) may cause channel inversion, such that the wireless channel becomes an additive white gaussian noise (AWGN) channel with orthogonal MIMO layers. In this way, the wireless device may skip the complex (e.g., heavy) processing steps associated with equalization, thereby simplifying the receiver at the wireless device.

In order to perform such pre-, the UE 115 may use channel state information (CSI) and noise variance information (with and without channel reciprocity) in order to evaluate the proper pre-equalizer response. The noise variance information may be a noise covariance matrix, denoted as $R_{nn}$, where R may is a covariance matrix, and n is a noise vector. The pre-equalizer evaluation may depend on the corresponding capabilities of the paired UE 115 and wireless device. For example, the UE 115 may be capable, or support, a transmission pre-equalizer and may provide one or more indications and sidelink information to the paired wireless device in order to target relatively simplified reception procedures. Further, the wireless device may be capable to provide information to the UE 115 to enable transmission pre-equalization (e.g., such as CSI and noise variance information, such as $R_{nn}$) and may be capable to receive from the UE 115 sidelink information in order for reception processing with the pre-equalization transmission scheme employed (e.g., such as reception sample scaling, spatial unbiasing, or LLR scaling factors).

In this way, the UE 115 may use various pre-equalization transmission schemes in order to reduce complexity at the receiver side, while also preserving the same performance (e.g., same performance as with a receiving equalization). In some cases, using the pre-equalization transmission schemes may provide some performance improvement. In order to support pre-equalization transmission schemes, the UE 115 and wireless device may implement various signaling aspects. For example, the UE 115 may indicate the pre-equalization transmission scheme to the wireless device. Further, the wireless device (e.g., reception side) may transmit CSI, noise variance information (e.g., $R_{nn}$), or both to the UE 115 (e.g., transmission side). In such examples, the CSI acquisition may depend on the channel reciprocity (and the possible channel estimation or CSI information acquisition procedures).

The techniques described herein may enable the UE 115 to dynamically select and use various pre-equalization transmission schemes for one or more downlink messages to the wireless device based on a SINR measurement of the wireless channel between the UE 115 and the wireless device, resulting in reduced processing and power consumption at the wireless device. For example, a first wireless device (e.g., the XR device) may transmit, to a second wireless device (e.g., the UE), a control message indicating a set of pre-equalization transmission schemes supported by the first wireless device. The first wireless device may also transmit a measurement report indicating a measurement (e.g., SINR) of the wireless channel between the first wireless device and the second wireless device.

In response, the second wireless device may transmit a control signal indicating a first pre-equalization transmission scheme, where the first pre-equalization transmission scheme is selected from the set of pre-equalization transmission schemes based on the measurement (e.g., SINR). For example, each pre-equalization transmission scheme of the set of pre-equalization transmission schemes may reduce the effects of channel noise and interference at various SINR measurements of the wireless channel. As such, the second wireless device may select the first pre-equalization transmission scheme based on at least the SINR measurement of the wireless channel. The second wireless device may pre-equalize the one or more downlink messages in accordance with the selected pre-equalization transmission scheme and transmit the one or more downlink messages to the first wireless device.

Figure 2:
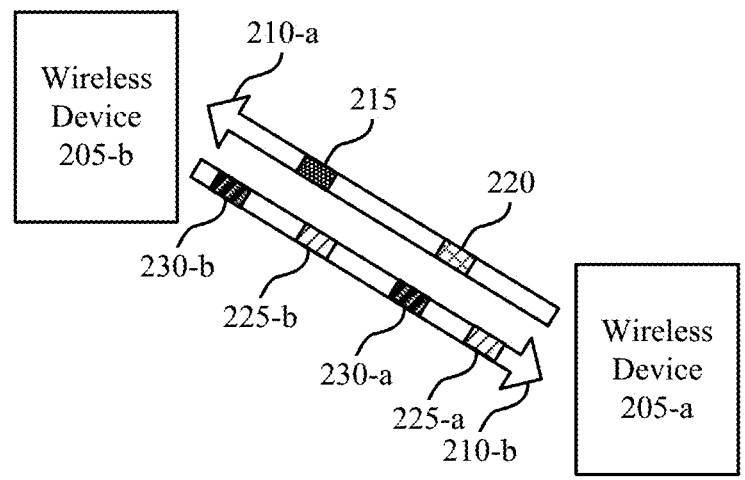
FIG. 2 shows an example of a wireless communications system that supports techniques for dynamic pre-equalization switching in accordance with one or more aspects of the present disclosure.
Figure 2:
Figure 2:
Figure 2:
Figure 2:
Figure 2:

FIG. 2 shows an example of a wireless communications system 200 that supports techniques for dynamic pre-equalization switching in accordance with one or more aspects of the present disclosure. Aspects of the wireless communications system 200 may implement, or be implemented by, aspects of the wireless communications system 100 as described herein with reference to FIG. 1. The techniques described in the context of the wireless communications system 200 may enable a wireless device 205-*b* (e.g., a second wireless device, UE 115) to pre-equalize a downlink message 230-*a*, such that a wireless device 205-*a* (e.g., first wireless device) may experience reduced processing power and increased power savings.

In some cases, the wireless device 205-*a* (e.g., such as XR glasses) may support, or be intended for, one or more XR applications. Such XR applications, and associated devices, may be a promising technology with a potential to be one of the leading products and key growth factors in the personal electronics segment. However, XR technologies may currently encounter various challenges and have unsolved limiting issues, which may lead to further development (e.g., have a long way to go) prior to commercialization and market penetration. One such issue may be how to implement and design such XR technologies for widespread usage and deployment (e.g., massive usage comparable with various other UEs 115, such as smartphones, smartwatches, wireless earbuds, or the like).

In order for widespread deployment and usage of the wireless device 205-*a*, the wireless device 205-*a* (e.g., XR glasses) may be designed such that it is appropriate and functional for users. For example, the wireless device 205-*a* may be designed to be light weight, such that the wireless device 205-*a* may be appropriate for long-time use (e.g., on the go usage) and be comparable with regular glasses (which may have approximately 30 gram to 40 gram weight). As such, the wireless device 205-*a* may be designed with various light weight components in order to reduce the weight of the wireless device, such as a light weigh battery, among others.

Additionally, the wireless device 205-*a* may be designed with limited processing complexity and power consumption relative to various other devices (e.g., such as smartphones, tablets, or the like) in order to comply with the available heat dissipation ability of the wireless device 205-*a* (e.g., which may be smaller than a heat dissipation ability of a UE 115, for example, because heat dissipation may be proportional to the surface size of each device). That is, for the wireless device 205-*a*, the power consumption at the wireless device 205-*a* may be limited due to the heat dissipation being limited to a relatively smaller quantity of Watts. As such, the wireless device 205-*a* may be designed with reasonable power consumption to allow for the implementation of the light-weight battery and to support a reasonable battery lifetime.

However, such limitations to the wireless device 205-*a* (e.g., reduced battery life, reduced processing power, or the like) may be challenging due to the relatively heavy processing involved to support various XR applications. For example, the wireless device 205-*a* (e.g., a stand-alone XR product) may not be able to comply with the aforementioned constraints (e.g., on the go requirements) and also support (e.g., be relevant for) a subset of XR applications and short time usage scenarios, which may be for a higher form factor head mounted device (HMD) usage. That is, due to the limited processing power and reduced battery life, the wireless device 205-*a* may not be able to support various XR applications associated with relatively high processing power, such as applications for HMD usage.

As such, because various (e.g., the majority of) XR applications and scenarios involve usage of high form factor HMD (resulting in high processing at the wireless device 205-*a*), part of XR related processing may be shifted to a companion device using a split XR approach in order to reduce complexity on wireless device 205-*a*. That is, a split XR approach may move some, if not all, of the (video) rendering related processing from the wireless device 205-*a* to the companion device. In such examples, however, processing components may still be implemented at the wireless device 205-*a* for various end-to-end (E2E) considerations, such as photon-to-motion latency requirements, device to device wireless link capacity, communication link power consumption for long-range links, among other considerations. The wireless device 205-*a* may use such split XR techniques over 5G NR communications (e.g., XR data traffic models and split XR architectures) as standardized by a standards body (e.g., such as the 3GPP standards).

However, even though moving, or otherwise offloading, various rendering processes to the companion device may reduce power consumption at the wireless device 205-*a*, the wireless device 205-*a* may continue to experience increased power consumption for less demanding video quality benchmarks, user experience benchmarks, or XR applications, such that XR splitting functionality may not remedy the technological limiting factors of the wireless device 205-*a*. As an illustrative example, such XR splitting functionality may not allow support for a various premium XR applications (e.g., mode demanding applications), such as XR applications that support a frame per second (FPS) rate greater than or equal to 120 Hertz (Hz) or video formats greater than or equal to 8000 pixels (e.g., FPS≥120 Hz, video formats≥8k).

In one case of XR splitting, the wireless device 205-*a* may communicate, and offload processes, with the companion device (e.g., such as a network entity 105) via long range communications links over a licensed spectrum, where such communications may have tight scheduling thresholds (due to the latency requirements of XR applications) and be staggered among different XR users. However, due to the long range communication links and increased processing of XR applications, a capacity per user of the wireless communications system 200 may be a limitation of such systems.

To mitigate such limitations, the wireless device 205-*a* may process data from one or more sensors locally (e.g., at the wireless device 205-*a*) in order to reduce the uplink data volume, such as data from sensors for six degrees of freedom (6DOF) tracking, data from sensors for eye tracking for field of view (FOV) derivation, or the like. Additionally, to support the limited link capacity for long range communication links, the wireless device 205-*a* and the companion device may compress various data packets. For example, the wireless device 205-*a* may compress sensor data or camera data from the XR application, while the companion device may compress the rendered video for wireless device 205-*a*, where such compressions may be performed by both devices with an increased compression factor due to a limited link capacity per user.

However, in such cases, the wireless device 205-*a* may experience increased processing and power consumption due to compressing the data. For example, the wireless device 205-*a* may pre-process the sensor data in addition to performing video compression with an increased compression factor (e.g., such as a high profile of H264 coding format) in order to support the limited capacity per user of the wireless channel. Such operations, however, may cause complex computations and processing at the wireless device 205-*a* (e.g., the encoder side) and may lead the wireless device 205-*a* to implement double data rate (DDR) memory usage for both transmission and reception path video processing, where the usage of such DDR memory may increase power consumption at the wireless device 205-*a*.

Further, due to photon-to-motion latency requirements and latency caused by using a companion device (e.g., network entity 105) for XR splitting or offloading, the wireless device 205 may also perform asynchronous time wrapping (ATW) for image alignment with the latest pose information, thereby further increasing complexity and processing at the wireless device 205-*a*. By supporting such compression and processing operations for long range communication links with the companion device (e.g., network entity 105), the power consumption of the wireless device 205-*a* (e.g., for light weight small form factor XR wearable smart glasses) may surpass a power consumption threshold (e.g., ~1.5-3 Watt).

Alternatively, to reduce the effects of such compression and processing techniques, the wireless device 205-*a* may communicate with a companion device, such as the wireless device 205-*b*, which may enable processing offloading and tethering with a relatively close (physical proximity) companion device or enable processing offloading between the wireless device 205-*a* and the wireless device 205-*b* and a network entity 105 (not shown). For example, the wireless device 205-*a* may communicate with the wireless device 205-*b* (e.g., such as a smartphone, tablet, or the like), where a distance between the wireless device 205-*b* and the wireless device 205-*a* is within a threshold distance (e.g., within close proximity). In such examples, the wireless device 205-*a* may transmit various uplink messages via the wireless channel 210-*a* using a Wi-Fi D protocol, while the wireless device 205-*b* may communicate the downlink message 230-*a* via a wireless channel 210-*b* using 5G sidelink protocols. Further, the wireless device 205-*b* may communicate with various network entities 105 via 5G NR Uu interfaces, where such network entities 105 may communicate with one or more edge or application servers.

In this way, the wireless device 205-*a* may communicate data, or offload processes, with a companion device that is physically located within a threshold distance from the wireless device 205-*a*. As such, from the perspective of the wireless device 205-*a*, the split in processing of various XR applications between the wireless device 205-*a* and the wireless device 205-*b* may assume a similar processing load and locally covered functionality at the wireless device 205-*a*, but with a local short range communication link with the wireless device 205-*b* (e.g., via the wireless channel 210-*a* and the wireless channel 210-*b*), which may reduce modem related power consumption. That is, by enabling the wireless device 205-*a* to offload data processing with the wireless device 205-*b*, the wireless device 205-*a* may experience reduced processing and reduced power consumption related to data compression and pre-processing at the modem of the wireless device 205-*a*.

Further, the wireless device 205-*a* may implement techniques for improvements for XR characteristics, key performance indicators (KPIs), or both in order to allow the wireless device 205-*a* to be a low power and light weight solution for wearable XR products. For example, such techniques may provide for the wireless device 205-*a* to implement increased processing offloading (e.g., aggressive offloading) to the wireless device 205-*a* (e.g., a UE 115 or a UE 115 and a network entity 105), such that the wireless device 205-*a* may be converted, or reduced, to an I/O device that provides (e.g., shares) local sensor information to the wireless device 205-*b* without any pre-processing. As an illustrative example of such increased processing offloading, the wireless device 205-*a* may transmit sensor data (e.g., camera data) to the wireless device 205-*a*, where in response, the wireless device 205-*a* may receive a rendered video to be displayed at the wireless device 205-*a* (e.g., XR glasses) without any post-processing. Such increased processing offloading may reduce XR device power consumption (by approximately 50%) relative to current XR splitting XR approaches.

As described, by employing the increased XR functionality split (e.g., aggressive XR functionality split), the wireless device 205-*a* may function similar to an I/O device, such that the transmissions and reception complexity of the wireless device 205-*a* may be shifted, or moved, to the wireless device 205-*b*. Such offloading, or shifting, of transmission and reception complexity from the wireless device 205-*a* to the wireless device 205-*b* may be desired across all functional components of the wireless device 205-*a*, including at physical and modem related complexity. For example, the wireless device 205-*a* may experience increased modem complexity due to reception side processing. In order to reduce such complexity, the wireless device 205-*a* may implement various techniques, or approaches, for different physical reception components, which may result in a XR sidelink design with low complexity, low power, and low latency.

One such technique may be transmission pre-equalization. For example, the wireless device 205-*b* may apply various pre-equalization transmission schemes in accordance with indications of CSI and noise variance information (e.g., $R_{nn}$) from the wireless device 205-*a*, which may reduce the receiving complexity and power consumption at the wireless device 205-*a*. For example, the wireless device 205-*b* may implement space-frequency transmission pre-equalization in order to cause effective channel inversion from the transmission side, such that, from the receiver perspective (e.g., wireless device 205-*a*), the communication channel becomes an AWGN channel with orthogonal MIMO layers. That is, the wireless device 205-*b* may use CSI of the wireless channel 210 between the wireless devices 205 for channel inversion, channel pre-equalization, inter-layer interference pre-cancellation, or a combination thereof.

By implementing such pre-equalization transmission schemes, related algorithmic enhancements, physical procedures, or the like, the wireless device 205-*a* and the wireless device 205-*b* may experience equivalent throughput and performance without any significant degradations compared to equalization at the wireless device 205-*a* for static channels with quasi-continuous CSI feedback. Further, different pre-equalization transmission schemes (e.g., pre-equalization methods) may incur different complexities for the wireless device 205-*b* (e.g., transmission side) and provide improved throughput based on various SINR ranges. For example, a transmission a minimum mean squared error (Tx-MMSE) LLR calculation may have less complexity relative to other pre-equalization transmission schemes. As such, it may be desirable for the wireless device 205-*a* and the wireless device 205-*b* to follow the (maximum) envelope of throughput that may be achieved with pre-equalization transmission schemes with a less, or reduced, complexity on both the transmission and reception sides. Additionally, different pre-equalization transmission schemes may not be equally sensitive to some channel impairments, CSI mismatches, or both. That is, it may be desirable for the wireless device 205-*a* to offload such physical layer and modem processing complexities to the wireless device 205-*b* using pre-equalization.

In accordance with the techniques described herein, the wireless device 205-*b* may implement dynamic switching of pre-equalization transmission schemes as a function of operational SINR. As such, the wireless device 205-*b* may dynamically adjust the pre-equalization transmission scheme in order to improve (e.g., maximize) the throughput of the wireless channel 210-*b*, while also reducing the overall complexity of the wireless device 205-*a*, by selecting a pre-equalizer for a given SINR region among a set of pre-equalization transmission schemes (e.g., pre-equalization candidate options).

For example, the wireless device 205-*a* may transmit a control message 215 indicating a set of pre-equalization transmissions supported by the wireless device 205-*a*. That is, the wireless device 205-*b* may dynamically switch between one or more pre-equalization transmission schemes based on the supported set of pre-equalization transmissions (from the perspective of the wireless device 205-*a*), which may be indicated via the control message 215 (e.g., XR capability message) to the wireless device 205-*b*. In such examples, the control message 215 may be an example of uplink control information (UCI) or UE assistance information (UAI).

The set of pre-equalization transmissions supported by the wireless device 205-*a* may include various linear pre-equalization transmission schemes, such as a linear transmission zero-forcing (Tx-ZF) pre-equalization transmission scheme or a linear Tx-MMSE pre-equalization transmission scheme, or various non-linear pre-equalization transmission schemes, such as a Tomlinson-Harashima (THP)-ZF pre-equalization transmission scheme (THP-ZF) or a THP-MMSE pre-equalization transmission scheme. Such linear and non-linear pre-equalization transmission schemes may be further described herein with reference to FIG. 3.

In response to transmitting the control message 215, the wireless device 205-*a* may transmit a measurement report 220 including at least the SINR (e.g., measurement) of the wireless channel 210-*b*. For example, the wireless device 205-*b* may transmit one or more downlink reference signals, such as CSI reference signals (CSI-RS), via the wireless channel 210-*b*. The wireless device 205-*a* may receive and measure such downlink reference signals to obtain the SINR of the wireless channel 210-*b*. In some examples, the wireless device 205-*a* may determine one or more channel characteristics of the wireless channel 210-*b* based on measuring the downlink reference signals, such as whether the wireless channel 210-*b* is a line of sight channel, whether the wireless channel 210-*b* is a flat channel, whether the wireless channel 210-*b* is a non-line of sight channel, whether the wireless channel 210-*b* experiences frequency domain flatness, Doppler characteristics of the wireless channel 210-*b*, or the like. In such examples, the wireless device 205-*a* may transmit, via the measurement report 220, the channel characteristics. The measurement report 220 may be an example of a CSI report.

In some examples, the wireless channel 210-*a* (e.g., uplink channel) and the wireless channel 210-*b* (e.g., downlink channel) may be reciprocal (e.g., have channel reciprocity). In such examples, the characteristics and measurements of the wireless channel 210-*a* may be equivalent, or similar to, those of the wireless channel 210-*b*. As such, in addition, or as an alternative to, receiving the measurement report 220, the wireless device 205-*b* may measure the SINR of the wireless channel 210-*a*, determine channel characteristics of the wireless channel 210-*a*, or both and apply such measurements and channel characteristics in order to select the pre-equalization transmission scheme.

Further, the wireless device 205-*b* may select a first pre-equalization transmission scheme to use for the downlink message 230-*a* from the set of pre-equalization transmission schemes. For example, the wireless device 205-*b* may select, or otherwise switch to, the first pre-equalization transmission scheme (e.g., make a switching decision) based on the measured operational SINR, the channel characteristics of the wireless channel 210-*b*, a waveform of the one or more downlink messages, the measured SINR of the wireless channel 210-*a* (e.g., if each wireless channel 210 is reciprocal), or a combination thereof. The wireless device 205-*b* may employ different pre-equalization transmission schemes in accordance with different waveforms, such as OFDM waveforms, DFT-s-OFDM waveforms, or the like. As such, the wireless device 205-*b* may perform dynamic switching (e.g., adaptation) of pre-equalization transmission schemes in accordance with different waveforms of the downlink message 230-*a*. In this way, dynamic switching of pre-equalization transmission schemes may be applicable for various waveforms of the downlink message 230-*a*.

Further, the wireless device 205-*b* may select, or switch to, the first pre-equalization transmission scheme based on the SINR of the wireless channel 210-*b* satisfying a SINR threshold (e.g., a measurement threshold). That is, in order to improve the performance of the transmission of the downlink message 230-*a* in terms of throughput, the wireless device 205-*b* may perform dynamic switching between various pre-equalization transmission schemes (e.g., pre-equalizers) based on evaluating the SINR threshold (e.g., optimized SINR threshold), where such SINR threshold may separate one or more SINR regions for which one pre-equalization transmission scheme may outperform another pre-equalization transmission scheme.

In such examples, the SINR threshold may be based, or dependent, on the channel characteristics of the wireless channel 210-*b*, such as whether the wireless channel 210-*b* is a line of sight channel, a flat channel, a non-line of sight channel, or a combination thereof. Further the SINR threshold may be based on whether the wireless channel 210-*b* experiences flatness in the frequency domain, one or more Doppler characteristics of the wireless channel 210-*b*, or other impairments of the wireless channel 210-*b*, such as non-linearity of the wireless channel 210-*b*, time and frequency residual errors of the wireless channel 210-*b*, or the like. In some examples, the wireless device 205-*b* may use one or more machine learning algorithms, with such channel characteristics as inputs, to evaluate (e.g., be trained) to determine the switching SINR thresholds.

Additionally, the SINR threshold may vary between different waveforms according to relative performance or throughput differences between different pre-equalization transmission schemes in each SINR region. That is, the SINR threshold may vary for different pre-equalization transmission schemes and different waveforms used for the downlink message 230-*a*. Thus, SINR optimization may be different per waveform, and the wireless device 205-*b* may be triggered to switch between pre-equalization transmission schemes at different conditions (e.g., waveforms, channel characteristics, or the like).

In some examples, the wireless device 205-*b* may determine, or use, a waveform for the downlink message 230-*a* in order to simplify modem design and reduce power consumption at the wireless device 205-*a*. For example, an OFDM waveform may achieve better capacity than a DFT-s-OFDM waveform. However, by using a DFT-s-OFDM waveform, the wireless device 205-*a* may eliminate, or refrain, from performing a FFT (e.g., with equal FFT and IFFT sizes employed at the wireless device 205-*b*), which may simplify the receiver design of the wireless device 205-*a*. Further, using a DFT-s-OFDM may also allow a lower peak-to-average power ratio (PAPR) as compared to that of the OFDM based waveform, which may reduce power consumption at the wireless device 205-*b* (e.g., transmission side) or improve communication coverage (e.g., which may be less relevant for ultra-wideband (UWB) scenario with a fixed transmission power restriction).

As an illustrative example of pre-equalization transmission selection, the wireless device 205-*b* may determine to use a DFT-s-OFDM waveform for the downlink message 230-*a*. In accordance with the set of supported pre-equalization transmission schemes received via the control message 215, the wireless device 205-*b* may select between a Tx-MMSE pre-equalization transmission scheme and a THP-MMSE pre-equalization transmission scheme based on a respective throughput for both schemes, where the respective throughput for both schemes may vary for the DFT-s-OFDM waveform at different SINR regions, channel characteristics, or both. As such, the wireless device 205-*b* may use one or more SINR thresholds to separate, or otherwise distinguish, the different SINR regions, such that the wireless device 205-*b* may select the pre-equalization transmission scheme (e.g., either the Tx-MMSE or THP-MMSE scheme) based on the SINR received via the measurement report.

For example, if the wireless channel 210-*b* is a flat channel (e.g., channel characteristic indicates flat channel), then the SINR threshold may be approximately 8.5 decibels (dB) (e.g., $SINR_{THR} \approx 8.5$). As such, if the SINR received via the measurement report 220 is less than or equal to 8.5 dB (e.g., in a first region less than 8.5 dB), then the wireless device 205-*b* may apply (e.g., select) the low complexity Tx-MMSE pre-equalization transmission scheme. Alternatively, if the SINR received via the measurement report 220 is greater than 8.5 dB (e.g., in a second SINR region greater than 8.5 dB), then the wireless device 205-*b* may apply the higher complexity THP-MMSE pre-equalizer.

However, if the wireless channel 210-*b* is a tapped-delay-line A (TDL-A) channel, then the SINR threshold may be approximately 11 dB (e.g., $SINR_{THR} \approx 11$). As such, if the SINR received via the measurement report 220 is less than or equal to 11 dB, then the wireless device 205-*b* may apply (e.g., select) the low complexity Tx-MMSE pre-equalization transmission scheme. Alternatively, if the SINR received via the measurement report 220 is greater than 11 dB, then the wireless device 205-*b* may apply the higher complexity THP-MMSE pre-equalization transmission scheme.

As described herein, the SINR thresholds for a DFT-s-OFDM waveform may be different than the SINR thresholds for an OFDM waveform depending on channel type and channel characteristics of the wireless channel 210-*b*. For example, the wireless device 205-*b* may determine to use an OFDM waveform for the downlink message 230-*a*. In accordance with the set of supported pre-equalization transmission schemes received via the control message 215, the wireless device 205-*b* may select between a Tx-MMSE pre-equalization transmission scheme and a THP-MMSE pre-equalization transmission scheme based on a respective throughput for both schemes, where the respective throughput for both schemes may vary for the DFT-s-OFDM waveform at different SINR regions, channel characteristics, or both.

For example, if the wireless channel 210-*b* is a flat channel (e.g., channel characteristic indicates flat fading channel), then the SINR threshold may be approximately 8.5 decibels (dB) (e.g., $SINR_{THR}$~8.5). As such, if the SINR received via the measurement report 220 is less than or equal to 8.5 dB, then the wireless device 205-*b* may apply (e.g., select) the low complexity Tx-MMSE pre-equalization transmission scheme. Alternatively, if the SINR received via the measurement report 220 is greater than 8.5 dB, then the wireless device 205-*b* may apply the higher complexity THP-MMSE pre-equalizer.

However, if the wireless channel 210-*b* is a TDL-A channel, then the SINR threshold may be approximately 10.5 dB (e.g., $SINR_{THR}$~10.5). As such, if the SINR received via the measurement report 220 is less than or equal to 10.5 dB, then the wireless device 205-*b* may apply (e.g., select) the low complexity Tx-MMSE pre-equalization transmission scheme. Alternatively, if the SINR received via the measurement report 220 is greater than 10.5 dB, then the wireless device 205-*b* may apply the higher complexity THP-MMSE pre-equalization transmission scheme.

In this way, the wireless device 205-*b* may select a lower complexity pre-equalization transmission scheme (e.g., such as a linear Tx-MMSE pre-equalization transmission scheme) for a relatively lower SINR region and select a relatively higher complexity transmission pre-equalizer (e.g., such as a THP-MMSE pre-equalization transmission scheme) for relatively higher SINR regions. As such, based on the SINR of the wireless channel 210-*b*, the wireless device 205-*b* may select the pre-equalization transmission scheme that may reduce channel noise and interference on the downlink message 230-*a* at the wireless device 205-*a*, resulting in less processing and increased power savings at the wireless device 205-*a*.

In response to selecting the first pre-equalization transmission scheme, the wireless device 205-*b* may transmit a control signal 225-*a* indicating the first pre-equalization transmission scheme is to be used for the downlink message 230-*a*, the waveform associated with the downlink message 230-*a*, or both. For example, the wireless device 205-*a* (e.g., receiving side) should be aware of the pre-equalization transmission scheme used by the wireless device 205-*b*, due to different pre-equalization transmission schemes causing different processing procedures at the wireless device 205-*a*.

As an illustrative example, a THP based scheme may involve a modulo operation at both the wireless device 205-*b* and the wireless device 205-*a*, enhanced LLR calculations at the wireless device 205-*a*, various time domain and frequency domain conversions related to modulo allocation at the wireless device 205-*b* in the case of DFT-s-OFDM with THP pre-equalizer, or a combination thereof. As such, the wireless device 205-*b* may transmit the control signal 225-*a* indicating the first pre-equalization transmission scheme, such that the wireless device 205-*a* is aware of which processes it may perform. By transmitting the control signal 225-*a* indicating the first pre-equalization transmission, the pre-equalization transmission scheme adaption may improve processing performance at the wireless device 205-*a* and be supported by dynamic signaling.

In some examples, the wireless device 205-*b* may transmit a power scaling parameter associated with the downlink message 230-*a*, where the power scaling parameter may indicate whether power scaling is applied across all the antennas of the wireless device 205-*b* or is applied per antenna of the wireless device 205-*b*. Such power scaling factor (g) may be further described herein with reference to FIG. 3. Further, the wireless device 205-*b* may transmit, via the control signal 225-*a*, one or more parameters (e.g., LLR parameters), such that the wireless device 205-*a* may performed the enhanced LLR calculations as described herein with reference to FIG. 4.

In some examples, the wireless device 205-*b* may dynamically transmit the control signal 225-*a* indicating the applied pre-equalization transmission scheme, where the control signal 225-*a* is an example of synchronized L1 or L2 level signaling using downlink control information (DCI), a medium access control-control element (MAC-CE), or other control signaling (e.g., that may be introduced by 6G communication standards). That is, the first pre-equalization transmission scheme, waveform, or both may be indicated per allocation of the downlink messages 230 (via DCI) or be dynamically activated using a MAC-CE.

In response to transmitting the control signal 225-*a*, the wireless device 205-*b* may pre-equalize the downlink message 230-*a* in accordance with the first pre-equalization transmission scheme and transmit the downlink message 230-*a* to the wireless device 205-*a*. In this way, the wireless device 205-*a* may receive the downlink message 230-*a* with reduced noise and interference resulting in reduced processing power and reduced power consumption at the wireless device 205-*a*. Additionally, by using the techniques described herein, the performance (e.g., throughput) of the pre-equalization transmission scheme may be equivalent to (e.g., the same as) the performance of equalization at the wireless device 205-*a*. Further, in some examples, the wireless device 205-*a* and the wireless device 205-*b* may experience various performance improvements (e.g., throughput improvements) by using the pre-equalization transmission scheme.

In some examples, the wireless device 205-*b* may transmit a control signal 225-*b* (e.g., second control message) indicating that pre-equalization for a downlink message 230-*b* (e.g., second downlink message) is disabled. For example, the wireless device 205-*b* may experience latency (e.g., latency that exceeds a latency threshold) with the measurement report 220 (e.g., CSI update) for the wireless channel 210-*b*. As a result, the wireless device 205-*b* may experience CSI (e.g., channel knowledge) aging for the wireless channel 210-*b*. In such examples, the wireless device 205-*b* may not be able to employ the pre-equalization transmission schemes in order to avoid degradation of the communications from the wireless device 205-*b* to the wireless device 205-*a*.

In such examples, it may be desirable for the wireless device 205-*a* to perform equalization for the downlink message 230-*b*. That is, for such examples, the wireless device 205-*a* may fallback to performing equalization for the downlink message 230-*b*. Additionally, the wireless device 205-*a* may fallback to performing equalization for the downlink message 230-a (e.g., initial downlink transmission) in cases when the wireless device 205-b has not acquired, or scheduled, the wireless channel 210-b (e.g., downlink channel) for pre-equalization evaluation.

In such examples, the wireless device 205-b may transmit the control signal 225-b (e.g., fallback indication) indicating that pre-equalization is disabled and for the wireless device 205-a to switch to reception side equalization. The wireless device 205-b may transmit the control signal 225-b (e.g., fallback mechanism) based on a quantity of unsuccessful uplink transmissions satisfying an unsuccessful uplink transmission threshold, which may indicate to the wireless device 205-b that it has not received an updated measurement report 220 (e.g., no updated CSI data indication) from the wireless device 205-a.

Additionally, or alternatively, the wireless device 205-b may transmit the control signal 225-b based on a quantity of unsuccessful downlink transmissions satisfying an unsuccessful downlink transmission threshold, which may indicate to the wireless device 205-b that it may be experiencing a channel knowledge or measurement report 220 mismatch in the wireless channel 210-b, resulting in degradation of the performance of the first pre-equalization transmission scheme. Further, the wireless device 205-b may transmit the control signal 225-b in response to a latency of the measurement report 220 satisfying a latency threshold. The latency of the measurement report 220 may be defined from the time of measurement report 220 taken at the wireless device 205-a to the current operating time of the wireless device 205-b. As such, the wireless device 205-b may transmit the downlink message 230-b without pre-equalization in accordance with the control signal 225-b (e.g., fallback indication), where the wireless device 205-a may receive the downlink message 230-b using equalization. In this way, the wireless device 205-a may not experience communication degradation for the downlink message 230-a due to latency associated with the measurement report 220 (e.g., channel aging).

By using the techniques described herein, the wireless device 205-a may be able to offload equalization processes to the wireless device 205-b without sacrificing throughput of the wireless channel 210-b, resulting in reduced power consumption and reduced processing at the wireless device 205-a. For example, by selecting the pre-equalization transmission scheme based on the SINR of the wireless channel 210-b, the channel characteristics of the wireless channel 210-b, the waveform of the downlink message 230-a, or a combination thereof, the wireless devices 205 may be able to support the highest throughput envelope per SINR operational point over the wireless channel 210-b with various waveforms and pre-equalization transmission schemes under a low complexity design of the wireless device 205-a. Further, by transmitting the control signal 225-b (e.g., fallback indication), the wireless devices 205 may support a fallback option for equalization at the wireless device 205-a for robustness and support efficient techniques for different channel impairments with extra waveform and pre-equalization transmission scheme flexibility. In this way, the wireless devices 205 may be able support complexity minimization under such adaptations and support efficient and robust implementation of pre-equalization transmission schemes for reduced complexity modems of the wireless device 205-a.

Figure 3A:
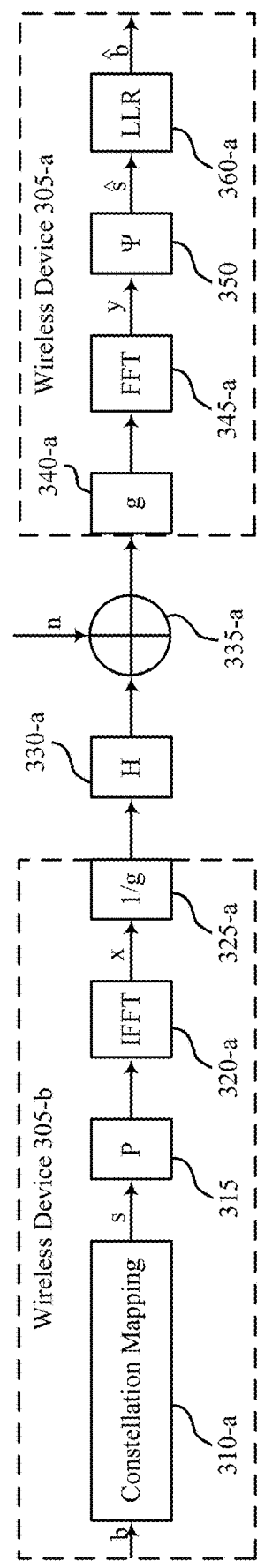
FIGS. 3A and 3B show examples of pre-equalization diagrams that support techniques for dynamic pre-equalization switching in accordance with one or more aspects of the present disclosure.
Figure 3B:
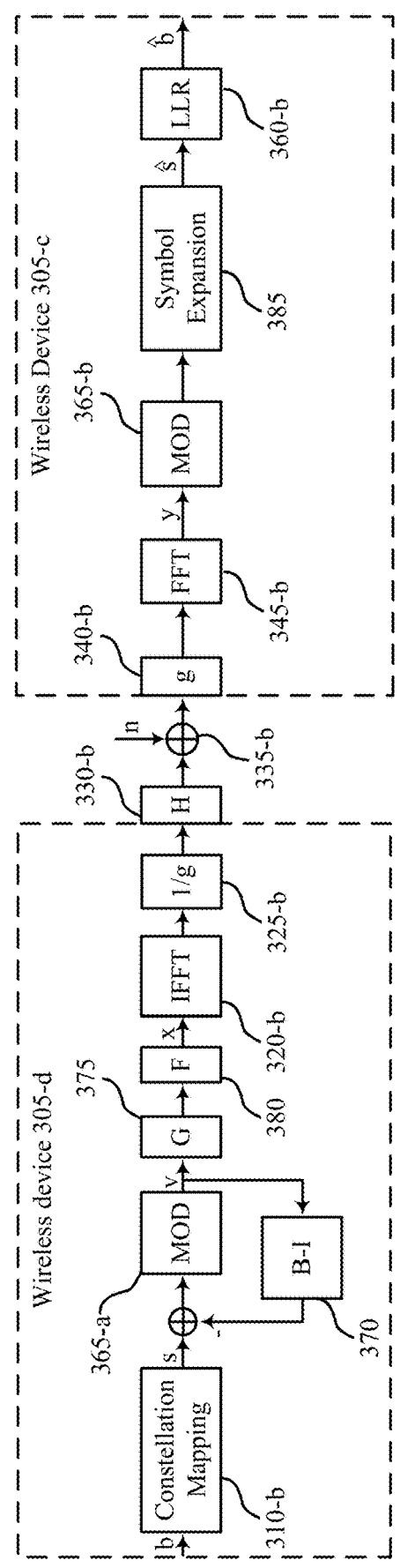

FIGS. 3A and 3B show examples of a pre-equalization diagram 300 and a pre-equalization diagram 301, respectively, that support techniques for dynamic pre-equalization switching in accordance with one or more aspects of the present disclosure. Aspects of the pre-equalization diagram 300 and the pre-equalization diagram 301 may implement, or be implemented by, aspects of the wireless communications system 100 and the wireless communications system 200 as described herein with reference to FIGS. 1 and 2. For example, the pre-equalization diagram 300 may include a wireless device 305-a (e.g., first wireless device) and a wireless device 305-b (e.g., a second wireless device), which may be examples of the wireless device 205-a and the wireless device 205-b respectively. Similarly, the pre-equalization diagram 301 may include a wireless device 305-c (e.g., first wireless device) and a wireless device 305-d (e.g., a second wireless device), which may also be examples of the wireless device 205-a and the wireless device 205-b, respectively.

In accordance with the techniques described herein, the wireless devices 305 may apply adaptive pre-equalization transmission scheme (e.g., pre-equalization diagram 300 or pre-equalization diagram 301) switching in order to achieve the highest throughput for a given SINR over a wireless channel between wireless devices 305, while also minimizing the overall complexity associated with the employed pre-equalization transmission scheme on both the transmission side (e.g., the wireless device 305-b and the wireless device 305-d) and the reception side (e.g., the wireless device 305-a and the wireless device 305-c). In such examples, the wireless devices 305 may implement various pre-equalization transmission schemes, such as linear pre-equalization transmission schemes and non-linear pre-equalization transmission schemes.

Such linear pre-equalization transmission schemes (e.g., as further described with reference to FIG. 3A) may include a Tx-ZF pre-equalization transmission scheme, a Tx-MMSE pre-equalization transmission scheme, among various other options. For example, a Tx-ZF pre-equalization transmission scheme may null out the effects of the wireless channel and interferences by applying a channel inversion. Alternatively, the Tx-MMSE pre-equalization transmission scheme may minimize the mean-square error between the transmitted signal b and the received signal b following a trade-off between residual channel distortion and noise enhancement. As such, Tx-MMSE based pre-equalization transmission schemes may provide improved results relative to Tx-ZF based pre-equalization transmission schemes.

Such non-linear pre-equalization transmission schemes (e.g., as further described with reference to FIG. 3B) may include THP-ZF pre-equalization transmission schemes, THP-MMSE pre-equalization transmission schemes, among various other options. For example, THP pre-equalization transmission schemes may be a practical or approximated implementation of "dirty paper coding," which may be configured (e.g., optimized) to achieve the improved (maximum) capacity over the wireless channel. Such THP pre-equalization transmission schemes may be used for interference (spatial inter-layer, multipath related inter-symbol interference (ISI), or both) pre-cancellation at the transmission side by a feedback filter, followed by a feedforward filter for channel pre-equalization. In such examples, the possible power boosting that may be caused by the feedback filter is limited with a modulo operator applied on the transmission side and another modulo operator on the reception side.

Further, to implement linear or non-linear pre-equalization transmission schemes, the wireless devices 305 may perform power scaling. For example, in order to preserve the allowed transmission power for the signal b, the wireless devices 305 may implement one of two transmission power scaling options. In a first power scaling option, the wireless devices 305 (e.g., wireless device 305-b and wireless device 305-d) may implement total power scaling across all antennas. In a second power scaling option, the wireless devices 305 (e.g., transmission side) may implement (maximum) power restriction and scaling per antenna. Such transmission power scaling may enable the corresponding reception noise enhancement and pre-equalization transmission scheme (e.g., that may rely on less transmission power scaling) to operate with a higher overall post processing signal-to-noise ratio (SNR). That is, such power scaling may increase the SNR of transmitted signal b, such that the wireless devices 305 (e.g., the wireless device 305-a and the wireless device 305-b) to receive a relatively higher power signal, thereby reducing the effects of noise on the signal b.

In some examples, the Tx-MMSE and THP-MMSE pre-equalization transmission schemes may achieve improved (e.g., better) performance in terms of throughput relative to Tx-ZF and THP-ZF pre-equalization transmission schemes. Further, the THP-MMSE pre-equalizer may be performed with less transmission power scaling, and therefore may be an improvement (e.g., superior) relative to the Tx-MMSE pre-equalizer at least for high SINR conditions.

Moreover, the THP-MMSE pre-equalization transmission scheme may not be affected by (e.g., suffer from) transmission power increases due to the modulo operator, and therefore may have increased inter-layer interference mitigation abilities as being used as a successive interference cancellation (SIC) pre-equalization transmission scheme on the transmission side. In some examples, however, due to the modulo operation on the reception side and in order to accomplish the modulo effect on the channel added interference, such that the modulo operation may be aligned with the modulo operation on the injected interference for pre-cancelation, the THP-MMSE may be affected by (e.g., suffer from) a modulo loss in low SINR relative to a Tx-MMSE pre-equalization transmission scheme, which may not use a reception side modulo operator. Further, in such examples, however, the THP-MMSE pre-equalization transmission scheme may have an increased complexity relative to the Tx-MMSE pre-equalization transmission scheme due to the modulo operator, feedback filter, and the enhanced LLR calculation.

The wireless device 305-b may select one of the linear pre-equalization transmission schemes based on a measurement (e.g., SINR) of the wireless channel 330, channel characteristics of the wireless channel 330, a waveform of the transmitted signal b, or a combination thereof as described herein with reference to FIG. 2. By applying the adaptive pre-equalization transmission scheme switching, the wireless devices 305 may be able to exploit each pre-equalization transmission scheme (e.g., Tx-ZF, Tx-MMSE, THP-ZF, THP-MMSE) per given SINR region, which may improve the achievable throughput compared to using a fixed pre-equalization method regardless of the SINR of the wireless channel. In this way, the wireless devices may use lower complexity transmission pre-equalizers (e.g., such as the Tx-MMSE pre-equalization transmission scheme) for lower SINR regions and use relatively higher complexity transmission pre-equalizers (e.g., such as the non-linear THP-MMSE pre-equalization transmission scheme) for higher SINR regions, as described herein with reference to FIG. 2.

FIG. 3A. The techniques described in the context of the pre-equalization diagram 300 may enable the wireless device 305-a to receive one or more downlink messages via the linear pre-equalization transmission schemes. That is, the pre-equalization diagram 300 may be an example of a linear pre-equalization transmission scheme (e.g., Tx-ZF or Tx-MMSE) applied at the wireless device 305-b for a downlink message b, which may be received and processed by the wireless device 305-a.

For example, the wireless device 305-b may generate a downlink message b intended for the wireless device 305-a. The wireless device 305-b may perform constellation mapping 310-a to map the data of the downlink message b to one or more modulation symbols, where such constellation mapping 310-a may be performed per MIMO layer. The wireless device 305-b may pre-equalize the mapped output s according to a pre-equalizer 315 (e.g., P), where the pre-equalizer 315 may be a pre-equalization transmission scheme (e.g., channel dependent matrix) selected in accordance with the techniques described herein.

For example, the wireless device 305-b may select a Tx-ZF pre-equalization transmission scheme in order to null out the effects of the noise 335-a of the wireless channel 330-a. Alternatively, the wireless device 305-b may select a Tx-MMSE pre-equalization transmission scheme in order to minimize the mean squared error between the transmitted signal and the received signal.

In response to pre-equalization the output s of the constellation mapping 310-a, the wireless device 305-b may perform an IFFT operation 320-a to produce an output x. Further, the wireless device 305-b may perform inverse power scaling operation 325-a of the output x, where g may represent a transmission scaling factor (e.g., to comply with total or per antenna power scaling and restriction). The wireless device 305-b may transmit the signal (e.g., output x) via the wireless channel 330-a (e.g., H), where the signal may be altered according to the addition of noise 335-a.

The wireless device 305-a may receive output and perform a power scaling operation 340-a using the power scaling parameter g. The wireless device 305-a may perform a FFT operation 345-a to obtain the output y. In some examples, if the pre-equalization transmission scheme is a Tx-ZF pre-equalization transmission scheme, the wireless device 305-a may apply an identity matrix Ψ 350 to the output y to obtain the output ŝ. In some other examples, if the pre-equalization transmission scheme is a Tx-MMSE pre-equalization transmission scheme, the wireless device 305-a may apply an unbiasing matrix Ψ 350 to the output y to obtain the output ŝ.

In response to applying the matrix Ψ 350, the wireless device 305-a may perform LLR calculations 360-a on the output ŝ to obtain the downlink message b̂. In this way, the wireless devices 305 may implement a linear pre-equalization transmission scheme, such that the wireless device 305-a may reduce processing and power consumption.

FIG. 3B. The techniques described in the context of the pre-equalization diagram 301 may enable the wireless device 305-c to receive one or more downlink messages via the non-linear pre-equalization transmission schemes. That is, the pre-equalization diagram 301 may be an example of a non-linear pre-equalization transmission scheme (e.g., THP-ZF or THP-MMSE) applied at the wireless device 305-d for a downlink message b, which may be received and processed by the wireless device 305-c.

For example, the wireless device 305-d may generate a downlink message b intended for the wireless device 305-c. In response to generating the downlink message b, The wireless device 305-d may perform constellation mapping 310-b to map the data of the downlink message b to one or more modulation symbols, where such constellation mapping 310-b may be performed per MIMO layer. The output of the constellation mapping 310-b may be an output s.

In accordance with the non-linear pre-equalization transmission scheme, the wireless device 305-d may perform a modulo operation 365-a and apply (e.g., feedback) the output of the modulo operation 365-a to a cancellation feedback matrix B-I 370, where the output of the cancellation feedback matrix B-I 370 may be added to the output of the constellation mapping 310-b. Such cancellation feedback matrix B-I 370 may be referred to as a cross layer interference cancellation feedback matrix (e.g., a channel dependent matrix) and perform transmission SIC.

Once the output v of the modulo operation 365-a has converged (e.g., settled) based on the cancellation feedback matrix B-I 370, the wireless device 305-d may apply a matrix 375 (e.g., G) to perform per layer scaling (e.g., MIMO layer power scaling) and apply a feedforward equalization matrix 380 (e.g., F) to the output v of the modulo operation 365-a. The wireless device 305-d may perform an IFFT operation 320-b on the output x of the feedforward equalization matrix 380 (e.g., F).

In response to performing the IFFT operation 320-b, the wireless device 305-d may perform an inverse power scaling operation 325-b of the output of the IFFT operation 320-b, where g may represent a transmission scaling factor (e.g., to comply with total or per antenna power scaling and restriction). The wireless device 305-d may transmit the signal via the wireless channel 330-b (e.g., H), where the signal may be altered according to the addition of noise 335-b.

The wireless device 305-c may receive the signal and perform a power scaling operation 340-b using the power scaling factor g. The wireless device 305-a may perform a FFT operation 345-b on the output of the power scaling operation 340-b to obtain the output y and may perform a modulo operation 365-b on the output y.

Figure 4:
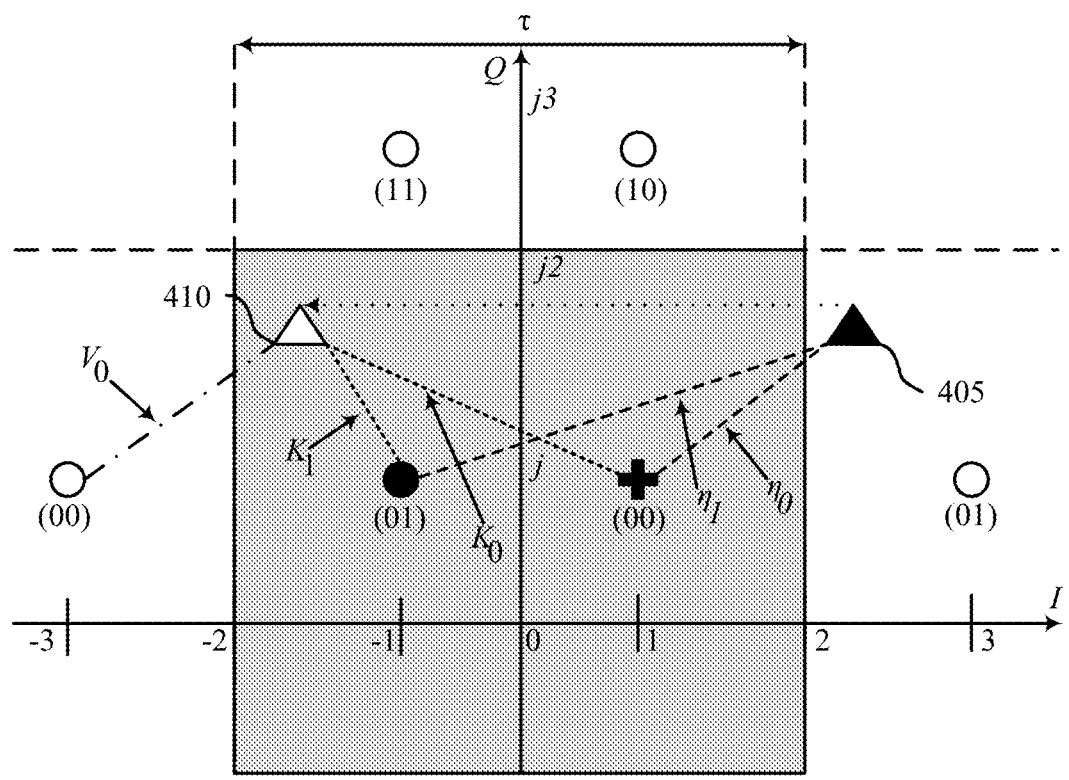
FIG. 4 shows an example of a false log likelihood ratio (LLR) detection and correction diagram that supports techniques for dynamic pre-equalization switching in accordance with one or more aspects of the present disclosure.

In some examples, if the pre-equalization transmission scheme is a THP-MMSE pre-equalization transmission scheme, the wireless device 305-c may perform a symbol expansion operation 385 on the output of the modulo operation 365-b in order to enhance the LLR calculations 360-b to mitigate loss related to the modulo operation 365-b at the wireless device 305-c, which may be further described herein with reference to FIG. 4. That is, in the example of the THP-MMSE pre-equalization transmission scheme, the wireless device 305-c may perform the symbol expansion operation 385 to obtain the output ŝ. Otherwise, if the pre-equalization transmission scheme is a THP-ZF pre-equalization transmission scheme, the wireless device 305-c may perform the modulo operation 365-b to obtain the output ŝ and skip performance of the symbol expansion operation 385.

The wireless device 305-c may perform LLR calculations 360-b on the output ŝ to obtain the downlink message b̂. The LLR calculations 360-b may be further described herein with reference to FIG. 4. In this way, the wireless devices 305 may implement a non-linear pre-equalization transmission scheme, such that the wireless device 305-c may reduce processing and power consumption.

FIG. 4 shows an example of a false LLR detection and correction diagram 400 that supports techniques for dynamic pre-equalization switching in accordance with one or more aspects of the present disclosure. Aspects of the false LLR detection and correction diagram 400 may be implemented by aspects of the wireless communications system 100, the wireless communications system 200, the pre-equalization diagram 300, and the pre-equalization diagram 301 as described herein with reference to FIGS. 1 through 3B. For example, the false LLR detection and correction diagram 400 may implemented by a first wireless device (e.g., such as the wireless device 205-a). The techniques described in the context of the false LLR detection and correction diagram 400 may enable the first wireless device to perform LLR calculations on a downlink message that has been pre-equalized according to a THP-MMSE pre-equalization transmission scheme as described herein.

For example, the first wireless device may experience noise related to a modulo operation (e.g., such as a modulo operation 365-b) of a THP-MMSE pre-equalization transmission scheme, where such noise may wrap the detected symbol resulting in a false LLR value and false bit detection. As such, the first wireless device may implement a LLR enhancement module (e.g., such as symbol expansion operation 385) in order to mitigate modulo related noise and reduce the erroneous LLR by cyclic constellation soft symbol expansion, which may result in reliable LLR values. Using such schemes may increase the complexity of THP-MMSE pre-equalization transmission scheme relative to the linear Tx-MMSE pre-equalization scheme. That is, the related mechanism (e.g., LLR enhancement module) may add more complexity to the THP-MMSE pre-equalization transmission scheme.

The false LLR detection and correction diagram 400 may be an example of an expanded quadrature phase shift keying constellation (e.g., which may be performed by the first wireless device using the constellation mapping 310-b). In such examples, the first wireless device may detect the symbol 405 (e.g., black triangle), which may be wrapped by the modulo operator into the symbol 410 using the LLR enhancement module.

For example, the first wireless device may calculate the $LLR_1^{b_1}$ (e.g., the original LLR calculation without modulo operations) as being equal to $\eta_1 - \eta_0$ (e.g., $LLR_1^{b_1} = \eta_1 - \eta_0$), which may result in a positive value with a high probability, related to bit '1' detection. Further, the first wireless device may calculate $LLR_2^{b_1}$ (e.g., the false LLR with modulo operations but no LLR enhancement module) as being equal to $K_1 - K_0$ (e.g., $LLRD_1^{b_1} = K_1 - K_0$), which may result in a negative value with high probability, related to bit '0' detection. However, with the LLR expansion module and modulo operations, the first wireless device may calculate the $LLR_3^{b_1}$ (e.g., expanded LLR calculation) as being equal to $K_1 - V_0$ (e.g., $LLRD_1^{b_1} = K_1 - V_0$), which may result in a negative value with low probability related to bit uncertainty. In such examples, the LLR unreliability may decrease and the first wireless device may be able to apply error correction and receive the symbol 410.

Figure 5:
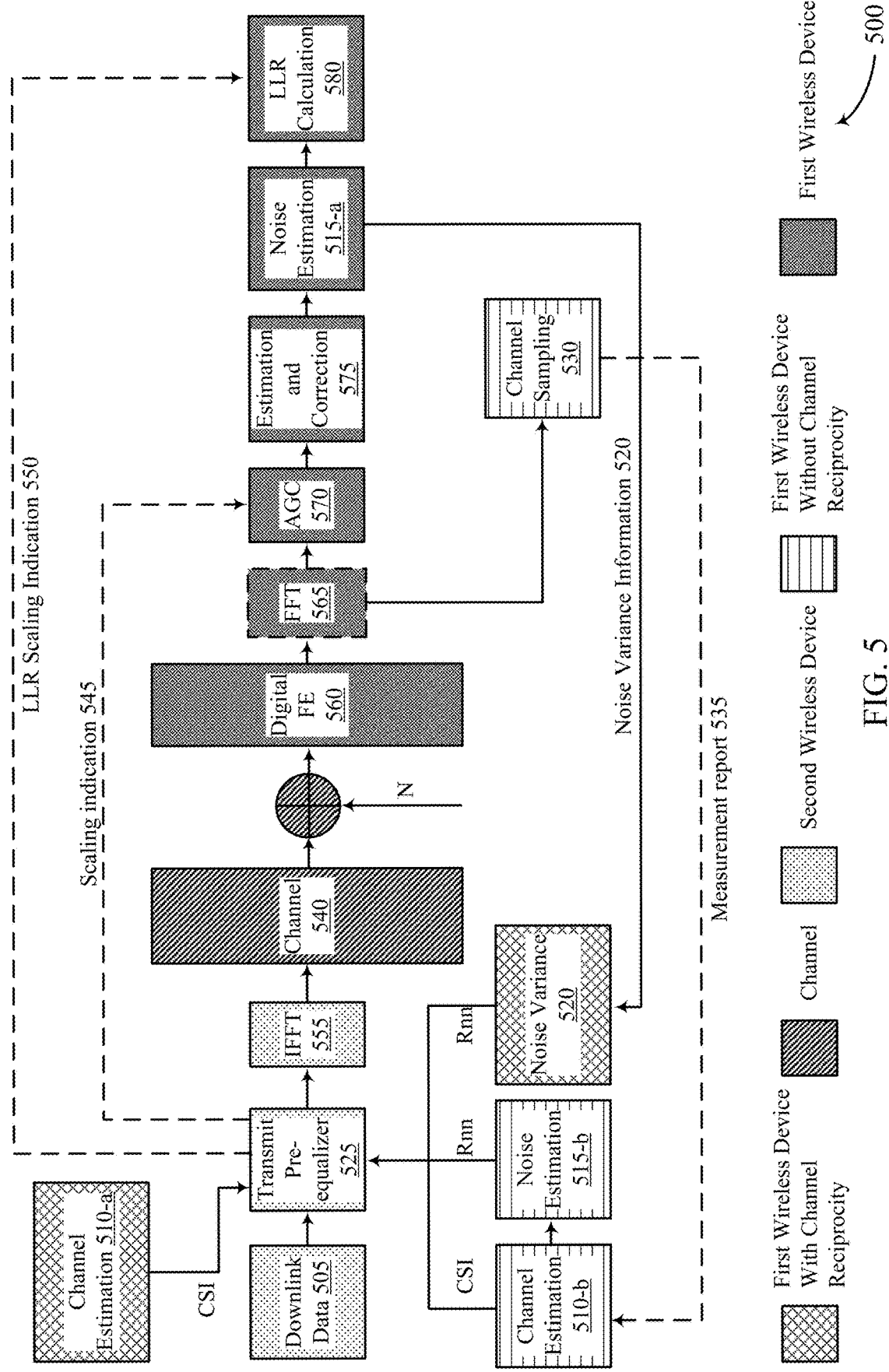
FIG. 5 shows an example of a pre-equalization diagram that supports techniques for dynamic pre-equalization switching in accordance with one or more aspects of the present disclosure.

FIG. 5 shows an example of a pre-equalization diagram 500 that supports techniques for dynamic pre-equalization switching in accordance with one or more aspects of the present disclosure. Aspects of the pre-equalization diagram 500 may implement, or be implemented by, aspects of the wireless communications system 100, the wireless communications system 200, the pre-equalization diagram 300, the pre-equalization diagram 301, and the false LLR detection and correction diagram 400 as described herein with reference to FIGS. 1 through 4. For example, the pre-equalization diagram 500 may be implemented by a first wireless device (e.g., such as a wireless device 205-a) and a second wireless device (e.g., such as a wireless device 205-b).

In accordance with the techniques described herein, the second wireless device may implement a transmit pre-equalizer 525 to perform one or more pre-equalization transmission schemes. By implementing the pre-equalization transmission schemes, the first wireless device may experience reduced complexity associated with receiving downlink data 505 (e.g., downlink message), resulting in reduced processing and reduced power consumption at the first wireless device.

For example, the second wireless device may pre-equalize the downlink data 505 intended for the first wireless device, where the second wireless device may select the pre-equalization transmission scheme based on a measurement (SINR) of a wireless channel 540, a characteristic of the wireless channel 540, a waveform of the downlink data 505, or a combination thereof. The wireless channel 540 may be an example of a wireless channel 210-b (e.g., a downlink channel) as described herein. As such, the CSI (e.g., SINR or channel characteristics) should be known to the second wireless device (e.g., transmission side). Further, prior to selecting the pre-equalization transmission scheme, the wireless device may use one or more machine learning or artificial intelligence models to calculate the SINR threshold, where the selection of the pre-equalization transmission scheme (e.g., adaptive pre-equalization transmission scheme switching) may be done based on a measurement (e.g., SINR) measured from the first wireless device in comparison with the SINR threshold. That is, the second wireless device may compare the SINR of the wireless channel 540 with the SINR threshold learned offline and select a pre-equalization transmission scheme based on whether the SINR is greater than or less than the SINR threshold.

In one example, the wireless channel 540 may be reciprocal to a wireless uplink channel between the first wireless device and the second wireless device. Such reciprocity may mean that the wireless channel 540 may have the same characteristics, measurements, or both as the wireless uplink channel. As such, the second wireless device may leverage such channel reciprocity to perform channel measurements on the wireless uplink channel and apply (e.g., use) such measurements for the wireless channel 540 (e.g., downlink channel) in selection of the transmit pre-equalizer 525.

For example, the second wireless device may perform channel estimation 510-a of wireless uplink channel (not shown) in order to obtain CSI (e.g., a measurement report 220 including channel characteristics and SINR) and select a transmit pre-equalizer 525 (e.g., pre-equalization transmission scheme) based on the obtained CSI. As described, such CSI may be associated with a wireless uplink channel with channel reciprocity with the wireless channel 540. In such examples of channel reciprocity, the first wireless device may perform noise estimation 515-a to obtain noise variance information 520, such as $R_{nn}$, and may transmit such noise variance information 520 to the second wireless device. The second wireless device may select a transmit pre-equalizer 525 based on the CSI from the channel estimation 510-a and the noise variance information 520 (e.g., SINR, channel characteristics, or both) in accordance with the techniques described herein with reference to FIG. 2.

In another example, the wireless channel 540 may not be reciprocal with a wireless uplink channel between the first wireless device and the second wireless device. In such examples, the second wireless device may receive a measurement report 535 (e.g., CSI) associated with the wireless channel 540 from the first wireless device. For example, the first wireless device may perform channel sampling 530 (e.g., measure the SINR, channel characteristics, or both) of the wireless channel 540 and transmit the measurement report 535 to the second wireless device. The second wireless device may use measurement report 535 (e.g., SINR, channel characteristics, or both) as the channel estimation 510-b (e.g., CSI) of the wireless channel 540. Further, the wireless device may use the measurement report 535 as noise estimation 515-b (e.g., noise variance information 520, such as $R_{nn}$) of the wireless channel 540. Based on the measurement report 535, the second wireless device may select a transmit pre-equalizer 525 in accordance with the techniques described herein with reference to FIG. 2.

Based on selecting the transmit pre-equalizer 525, the second wireless device may transmit a control signal (e.g., such as the control signal 225-a) to the first wireless device indicating the selected transmit pre-equalizer 525. In some examples, in order to account for transmission power constraints (e.g., total power applied and power scaling factor (g) per antenna as described herein with reference to FIG. 3), the second wireless device may transmit, via the control signal, a power scaling indication 545 (g), which may indicate how the second wireless device is to scale the power of the antennas used to transmit the downlink data 505. Further, the second wireless device may transmit, via the control signal, one or more parameters associated with receiving the downlink data 505, such as an LLR scaling indication 550 (e.g., partial LLR scaling indication). Further, as described herein, the second wireless device may transmit an indication of the waveform used (e.g., first waveform) for the downlink data 505.

The second wireless device may pre-equalize the downlink data 505, perform an IFFT procedure 555 on the pre-equalized downlink data 505, and transmit the downlink data 505 via the wireless channel 540. The first wireless device may receive the pre-equalized downlink data 505 and perform a digital front end (FE) procedure 560 on the pre-equalized downlink data 505. In some examples, if a DFT-s-OFDM waveform was used to transmit the downlink data 505, the first wireless device may skip, or otherwise eliminate, performance of FFT 565; otherwise, the first wireless device may perform the FFT 565 using the pre-equalized downlink data 505. Further, the first wireless device may perform an automatic gain control (AGC) procedure 570 per layer of the pre-equalized downlink data 505. In such examples, the first wireless device may perform the AGC procedure based on the power scaling indication 545 (e.g., g) received from the first wireless device.

Based on performing the AGC procedure 570, the first wireless device may perform an estimation and correction procedure 575, where such estimation and correction procedure 575 may be to correct carrier frequency offsets (CFO) and symbol timing offsets (STO). The first wireless device may then perform noise estimation 515-a on the downlink data 505 and perform LLR calculations 580 on the downlink data 505 in accordance with the LLR scaling indication 550. In this way, the first wireless device may receive downlink data 505 pre-equalized according to the transmit pre-equalizer 525, thereby resulting in reduced processing and reduced power consumption at the first wireless device.

Figure 6:
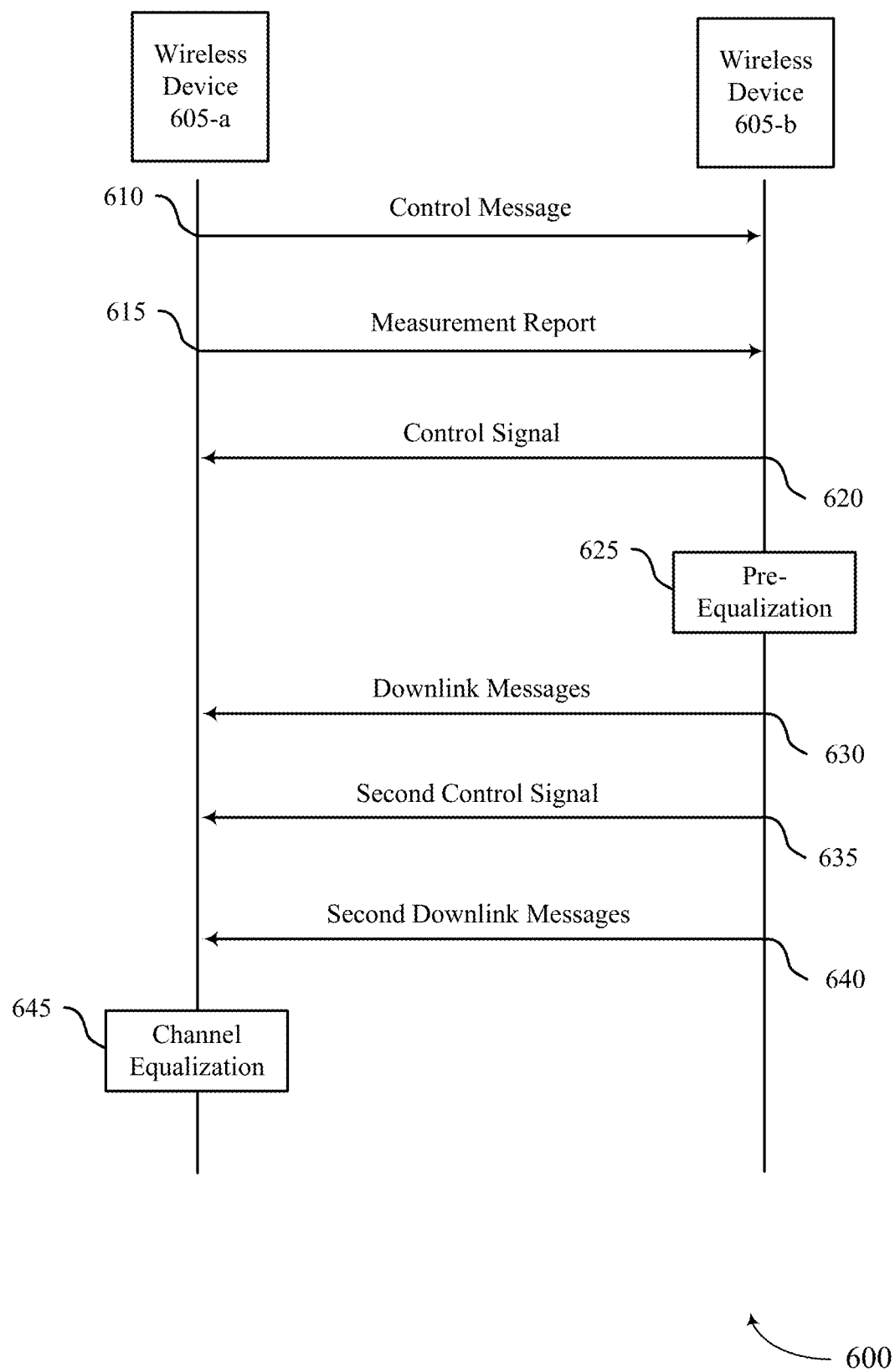
FIG. 6 shows an example of a process flow that supports techniques for dynamic pre-equalization switching in accordance with one or more aspects of the present disclosure.

FIG. 6 shows an example of a process flow 600 that supports techniques for dynamic pre-equalization switching in accordance with one or more aspects of the present disclosure. Aspects of the process flow 600 may implement, or be implemented by, aspects of the wireless communications system 100, the wireless communications system 200, the pre-equalization diagram 300, the pre-equalization diagram 301, the false LLR detection and correction diagram 400, and the pre-equalization diagram 500 as described herein with reference to FIGS. 1 through 5. For example, the process flow 600 may include a wireless device 605-a and a wireless device 605-b, which may be examples of wireless devices as described herein.

The wireless device 605-*a* (e.g., first wireless device) may be an example of a device that is intended for, or implements, XR applications. The wireless device 605-*b* (e.g., second wireless device) may be an example of a UE 115 or network entity 105 that supports the wireless device 605-*a*. The techniques described in the context of the process flow 600 may enable the wireless device 605-*b* to dynamically switch between pre-equalization transmission schemes for downlink messages based on an SINR of the channel, thereby enabling the wireless device 605-*a* to reduce complexity associated with receiving the downlink messages.

At 610, the wireless device 605-*a* may transmit a control message (e.g., such as the control message 215) indicating a set of pre-equalization transmission schemes supported by the wireless device 605-*a*, where such pre-equalization transmission schemes may be used by the wireless device 605-*b* to pre-equalize one or more downlink messages intended for the wireless device 605-*a*. The pre-equalization transmission schemes supported at the wireless device 605-*a* may include one of a Tx-ZF pre-equalization transmission scheme, a Tx-MMSE pre-equalization transmission scheme, a THP-ZF pre-equalization transmission scheme, or a THP-MMSE pre-equalization transmission scheme as described herein with reference to FIGS. 3 and 5.

At 615, the wireless device 605-*a* may transmit a measurement report (e.g., such as the measurement report 220) indicating a measurement of a wireless channel between the wireless device 605-*a* and the wireless device 605-*b*. In some examples, the measurement may be a SINR of the wireless channel. Additionally, the wireless device 605-*a* may transmit, via the measurement report, one or more channel characteristics of the wireless channel, such as whether the wireless channel is a line of sight channel, whether the wireless channel has flatness in the frequency domain, Doppler characteristics of the wireless channel, residual time and frequency errors, or the like.

At 620, the wireless device 605-*b* may transmit a control signal (e.g., such as the control signal 225-*a*) indicative of a first pre-equalization transmission scheme to be used by the wireless device 605-*b* for the pre-equalization of the one or more downlink messages. In such examples, the wireless device 605-*b* may transmit, via the control signal, an indication of a waveform for the one or more downlink messages, a power scaling parameter (e.g., such as the transmission to reception scaling indication as described in FIG. 5), one or more parameters of the first pre-equalization transmission scheme (e.g., such as the LLR scaling indication as described in FIGS. 4 and 5), or a combination thereof.

For example, the wireless device 605-*b* may select the first pre-equalization transmission scheme from the set of pre-equalization transmission schemes based on the measurement (e.g., SINR) of the wireless channel. Additionally, the wireless device 605-*b* may select the first pre-equalization transmission scheme based on a waveform of the one or more downlink messages (e.g., such as an OFDM waveform or a DFT-s-OFDM waveform), the channel characteristics of the wireless channel, or both. That is, the wireless device 605-*b* may select the first pre-equalization transmission scheme based on whether the measurement (e.g., SINR) satisfies a measurement threshold associated with the first pre-equalization transmission scheme, where the measurement threshold is based on the channel characteristic, the waveform, or both as described herein with reference to FIG. 2.

At 625, in response to selecting and transmitting the indication of the first pre-equalization transmission scheme, the wireless device 605-*b* may pre-equalize the one or more downlink messages in accordance with the first pre-equalization transmission scheme. At 630, the wireless device 605-*b* may transmit, via the wireless channel, the one or more downlink messages (e.g., such as downlink message 230-*a*) pre-equalized according to the first pre-equalization transmission scheme at 625.

At 630, the wireless device 605-*b* may transmit a second control signal (e.g., such as the control signal 225-*b*) indicating that pre-equalization for one or more second downlink messages is disabled. In such examples, the wireless device 605-*b* may transmit the indication to disable pre-equalization based on a latency associated with the channel measurement reporting satisfying a latency threshold, a quantity of unsuccessful transmissions between the wireless device 605-*a* and the wireless device 605-*b* satisfying a quantity threshold, or both. At 640, the wireless device 605-*b* may transmit the one or more second downlink messages. At 645, the wireless device 605-*a* may receive, using channel equalization, the one or more second downlink messages based on the second control signal at 635.

Figure 7:
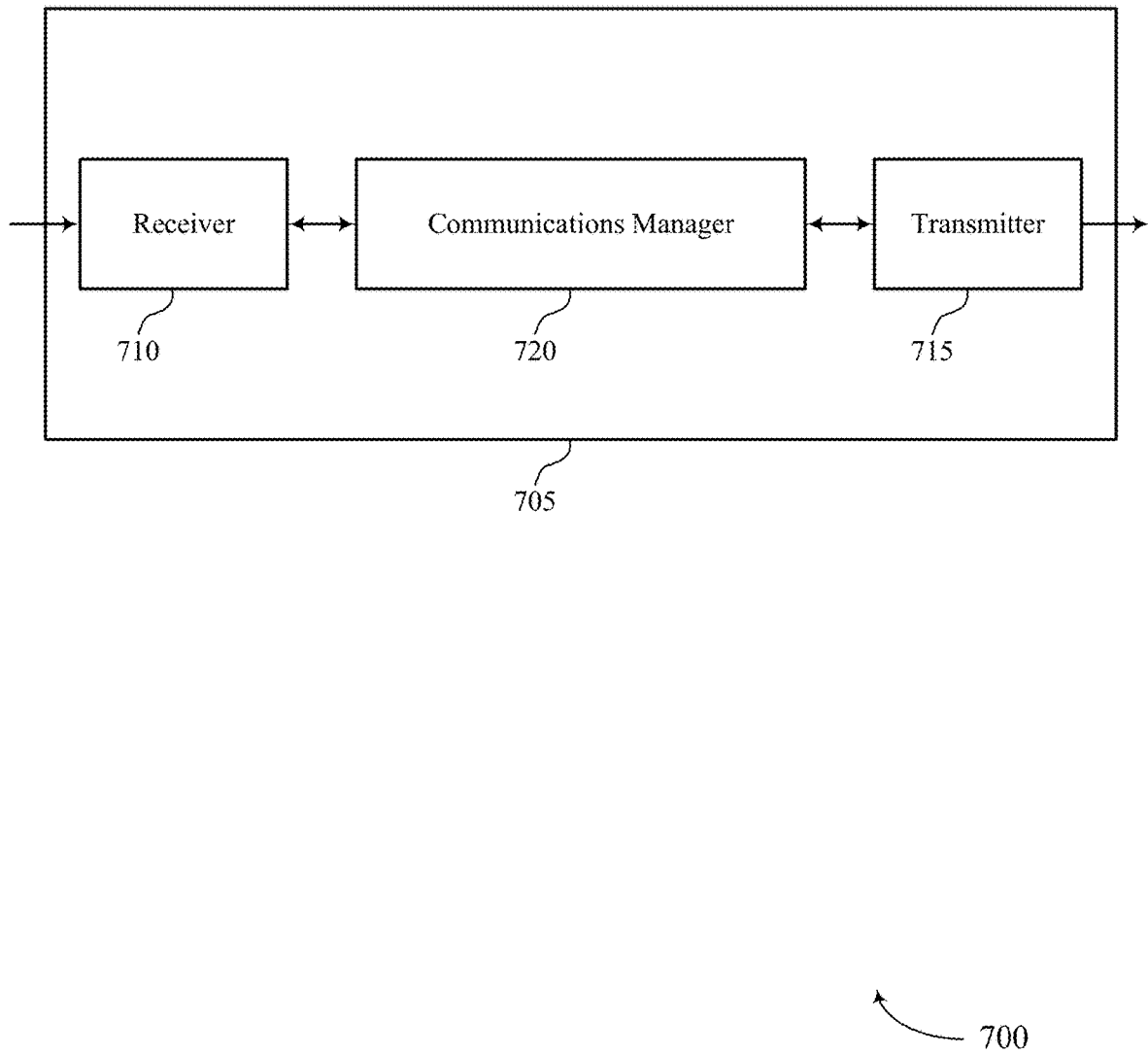
FIGS. 7 and 8 show block diagrams of devices that support techniques for dynamic pre-equalization switching in accordance with one or more aspects of the present disclosure.

FIG. 7 shows a block diagram 700 of a device 705 that supports techniques for dynamic pre-equalization switching in accordance with one or more aspects of the present disclosure. The device 705 may be an example of aspects of a UE 115 as described herein. The device 705 may include a receiver 710, a transmitter 715, and a communications manager 720. The device 705 may also include one or more processors. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for dynamic pre-equalization switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for dynamic pre-equalization switching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for dynamic pre-equalization switching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include one or more processors, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, one or more processors and one or more memories coupled with the one or more processors may be configured to perform one or more of the functions described herein (e.g., by executing, by the one or more processors, instructions stored in the one or more memories).

Additionally, or alternatively, in some examples, the communications manager 720, the receiver 710, the transmitter 715, or various combinations or components thereof may be implemented in code (e.g., as communications management software or firmware) executed by one or more processors. If implemented in code executed by one or more processors, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first wireless device in accordance with examples as disclosed herein. For example, the communications manager 720 is capable of, configured to, or operable to support a means for transmitting a control message indicating a set of pre-equalization transmission schemes supported by the first wireless device for receipt of messaging pre-equalized by a second wireless device for transmission to the first wireless device. The communications manager 720 is capable of, configured to, or operable to support a means for transmitting a measurement report indicating a measurement of a wireless channel between the first wireless device and the second wireless device. The communications manager 720 is capable of, configured to, or operable to support a means for receiving a control signal indicative of a first pre-equalization transmission scheme to be used by the second wireless device for pre-equalization based on the set of pre-equalization transmission schemes and the measurement. The communications manager 720 is capable of, configured to, or operable to support a means for receiving, via the wireless channel, one or more downlink messages pre-equalized in accordance with the first pre-equalization transmission scheme.

Additionally, or alternatively, the communications manager 720 may support wireless communications at a second wireless device in accordance with examples as disclosed herein. For example, the communications manager 720 is capable of, configured to, or operable to support a means for receiving a control message indicating a set of pre-equalization transmission schemes supported by a first wireless device for receipt of messaging pre-equalized by the second wireless device for transmission to the first wireless device. The communications manager 720 is capable of, configured to, or operable to support a means for receiving a measurement report indicating a measurement of a wireless channel between the first wireless device and the second wireless device. The communications manager 720 is capable of, configured to, or operable to support a means for transmitting a control signal indicative of a first pre-equalization transmission scheme to be used by the second wireless device for pre-equalization based on the set of pre-equalization transmission schemes and the measurement. The communications manager 720 is capable of, configured to, or operable to support a means for transmitting, via the wireless channel, one or more downlink messages pre-equalized in accordance with the first pre-equalization transmission scheme.

By including or configuring the communications manager 720 in accordance with examples as described herein, the device 705 (e.g., one or more processors controlling or otherwise coupled with the receiver 710, the transmitter 715, the communications manager 720, or a combination thereof) may support techniques for a first wireless device to receive one or more downlink messages that have been pre-equalized by a second wireless device, resulting in reduced processing and reduced power consumption.

Figure 8:
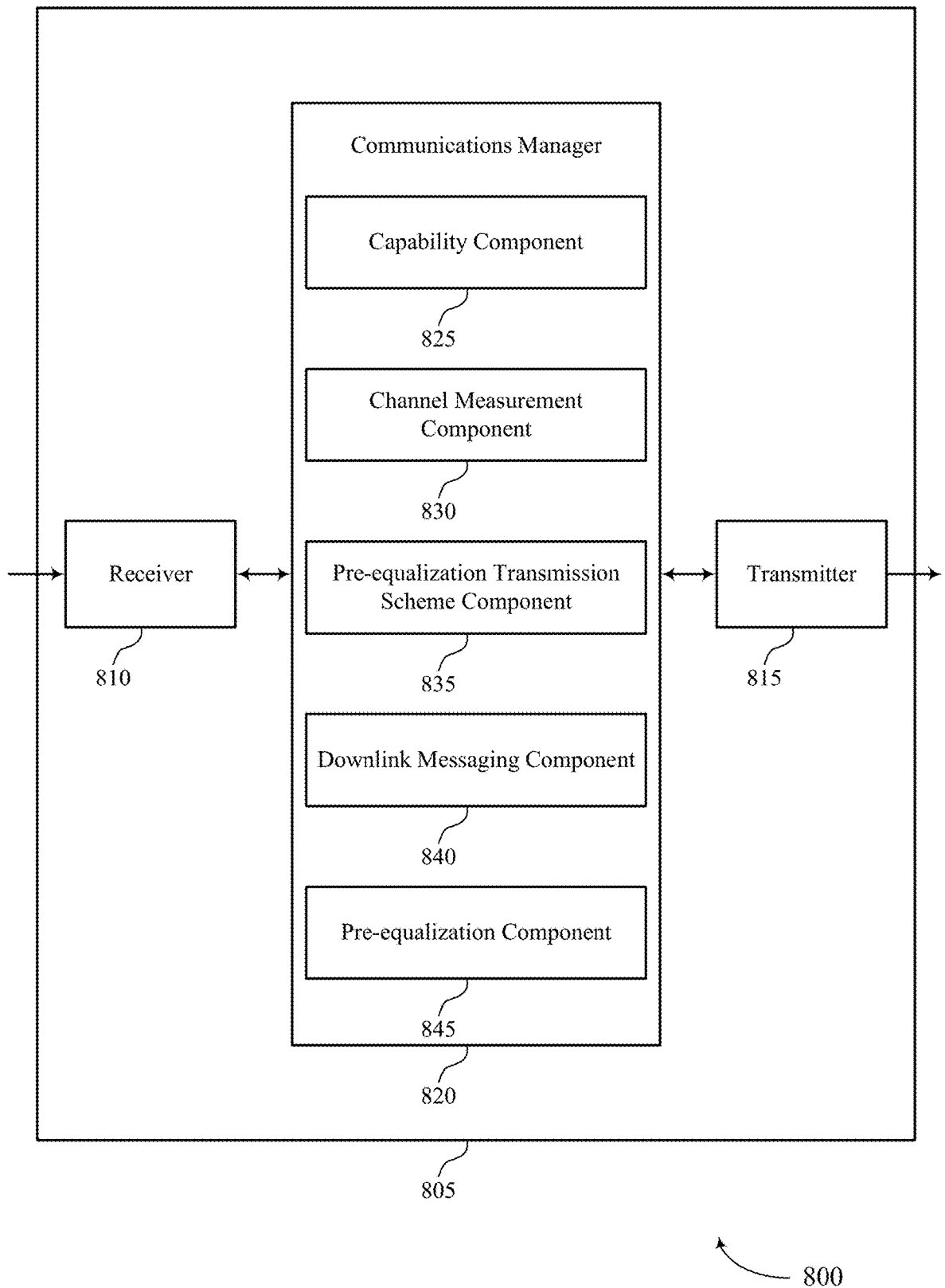

FIG. 8 shows a block diagram 800 of a device 805 that supports techniques for dynamic pre-equalization switching in accordance with one or more aspects of the present disclosure. The device 805 may be an example of aspects of a device 705 or a UE 115 as described herein. The device 805 may include a receiver 810, a transmitter 815, and a communications manager 820. The device 805 may also include one or more processors. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for dynamic pre-equalization switching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for dynamic pre-equalization switching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for dynamic pre-equalization switching as described herein. For example, the communications manager 820 may include a capability component 825, a channel measurement component 830, a pre-equalization transmission scheme component 835, a downlink messaging component 840, a pre-equalization component 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first wireless device in accordance with examples as disclosed herein. The capability component 825 is capable of, configured to, or operable to support a means for transmitting a control message indicating a set of pre-equalization transmission schemes supported by the first wireless device for receipt of messaging pre-equalized by a second wireless device for transmission to the first wireless device. The channel measurement component 830 is capable of, configured to, or operable to support a means for transmitting a measurement report indicating a measurement of a wireless channel between the first wireless device and the second wireless device. The pre-equalization transmission scheme component 835 is capable of, configured to, or operable to support a means for receiving a control signal indicative of a first pre-equalization transmission scheme to be used by the second wireless device for pre-equalization based on the set of pre-equalization transmission schemes and the measurement. The downlink messaging component 840 is capable of, configured to, or operable to support a means for receiving, via the wireless channel, one or more downlink messages pre-equalized in accordance with the first pre-equalization transmission scheme.

Additionally, or alternatively, the communications manager 820 may support wireless communications at a second wireless device in accordance with examples as disclosed herein. The capability component 825 is capable of, configured to, or operable to support a means for receiving a control message indicating a set of pre-equalization transmission schemes supported by a first wireless device for receipt of messaging pre-equalized by the second wireless device for transmission to the first wireless device. The channel measurement component 830 is capable of, configured to, or operable to support a means for receiving a measurement report indicating a measurement of a wireless channel between the first wireless device and the second wireless device. The pre-equalization transmission scheme component 835 is capable of, configured to, or operable to support a means for transmitting a control signal indicative of a first pre-equalization transmission scheme to be used by the second wireless device for pre-equalization based on the set of pre-equalization transmission schemes and the measurement. The pre-equalization component 845 is capable of, configured to, or operable to support a means for transmitting, via the wireless channel, one or more downlink messages pre-equalized in accordance with the first pre-equalization transmission scheme.

Figure 9:
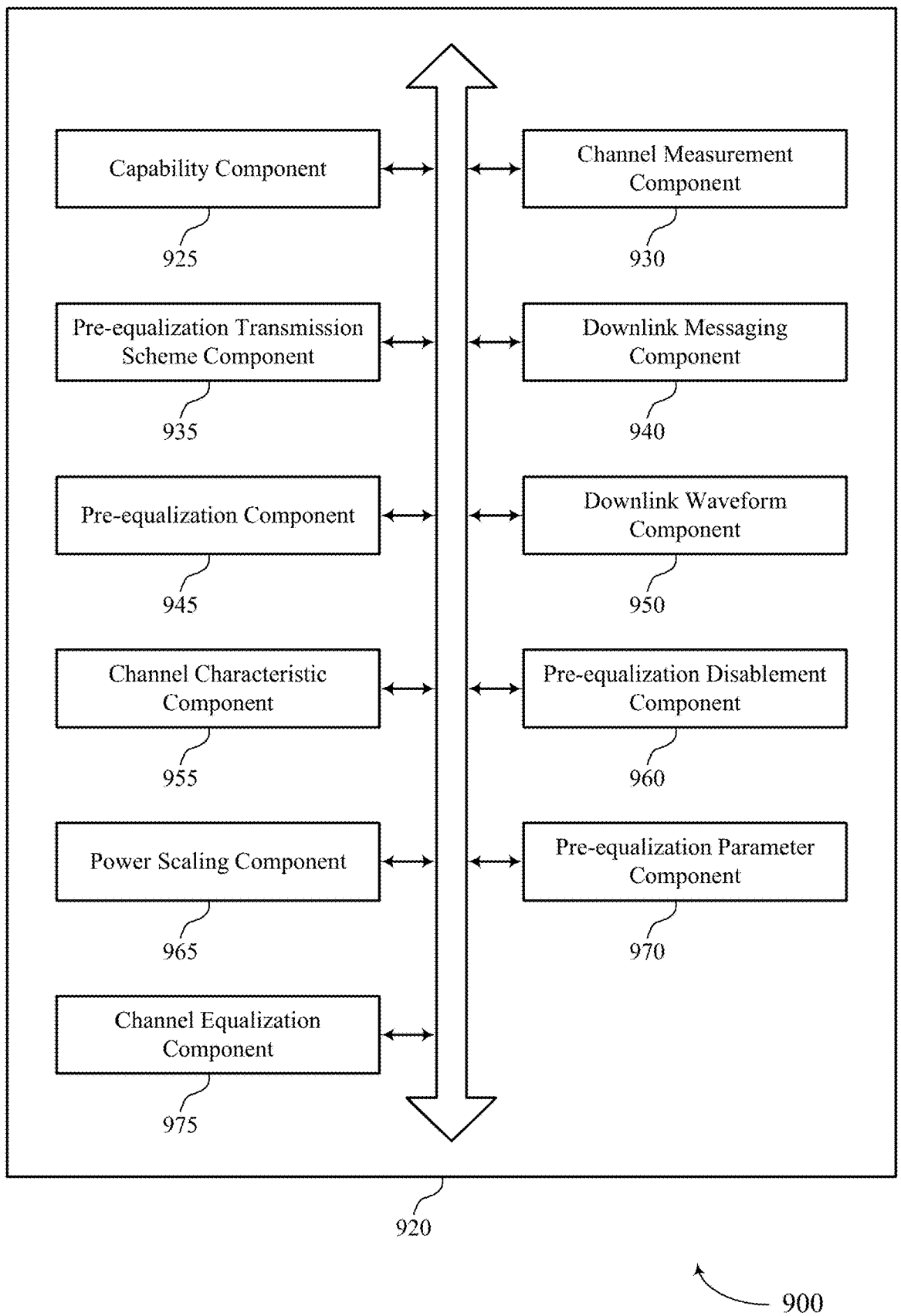
FIG. 9 shows a block diagram of a communications manager that supports techniques for dynamic pre-equalization switching in accordance with one or more aspects of the present disclosure.

FIG. 9 shows a block diagram 900 of a communications manager 920 that supports techniques for dynamic pre-equalization switching in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for dynamic pre-equalization switching as described herein. For example, the communications manager 920 may include a capability component 925, a channel measurement component 930, a pre-equalization transmission scheme component 935, a downlink messaging component 940, a pre-equalization component 945, a downlink waveform component 950, a channel characteristic component 955, a pre-equalization disablement component 960, a power scaling component 965, a pre-equalization parameter component 970, a channel equalization component 975, or any combination thereof. Each of these components may communicate, directly or indirectly, with one another (e.g., via one or more buses).

The communications manager 920 may support wireless communications at a first wireless device in accordance with examples as disclosed herein. The capability component 925 is capable of, configured to, or operable to support a means for transmitting a control message indicating a set of pre-equalization transmission schemes supported by the first wireless device for receipt of messaging pre-equalized by a second wireless device for transmission to the first wireless device. The channel measurement component 930 is capable of, configured to, or operable to support a means for transmitting a measurement report indicating a measurement of a wireless channel between the first wireless device and the second wireless device. The pre-equalization transmission scheme component 935 is capable of, configured to, or operable to support a means for receiving a control signal indicative of a first pre-equalization transmission scheme to be used by the second wireless device for pre-equalization based on the set of pre-equalization transmission schemes and the measurement. The downlink messaging component 940 is capable of, configured to, or operable to support a means for receiving, via the wireless channel, one or more downlink messages pre-equalized in accordance with the first pre-equalization transmission scheme.

In some examples, the downlink waveform component 950 is capable of, configured to, or operable to support a means for receiving, as part of the control signal, an indication of a first waveform of the one or more downlink messages, where the control signal indicates the first pre-equalization transmission scheme based on the first waveform of the one or more downlink messages.

In some examples, the channel characteristic component 955 is capable of, configured to, or operable to support a means for transmitting, as part of the measurement report, an indication of a channel characteristic of the wireless channel between the first wireless device and the second wireless device, where the control signal indicates the first pre-equalization transmission scheme based on the channel characteristic.

In some examples, the pre-equalization disablement component 960 is capable of, configured to, or operable to support a means for receiving a second control signal indicating that pre-equalization for one or more second downlink messages is disabled based on at least one of a latency associated with channel measurement reporting satisfying a latency threshold or a quantity of unsuccessful transmissions between the first wireless device and the second wireless device satisfying a quantity threshold.

In some examples, the channel equalization component 975 is capable of, configured to, or operable to support a means for receiving, using channel equalization, the one or more second downlink messages based on the second control signal.

In some examples, the power scaling component 965 is capable of, configured to, or operable to support a means for receiving, as part of the control signal, an indication of a power scaling parameter associated with the first pre-equalization transmission scheme, where the one or more downlink messages are received in accordance with the power scaling parameter.

In some examples, the pre-equalization parameter component 970 is capable of, configured to, or operable to support a means for receiving, as part of the control signal, an indication of one or more parameters associated with the first pre-equalization transmission scheme, where the one or more downlink messages are received based on the one or more parameters.

In some examples, the control signal indicates the first pre-equalization transmission scheme based on the measurement satisfying a measurement threshold, and the measurement threshold is based on one of a channel characteristic of the wireless channel between the first wireless device and the second wireless device, or a waveform of the one or more downlink messages, or both.

In some examples, the first pre-equalization transmission scheme includes at least one of a Tx-ZF pre-equalization transmission scheme, a Tx-MMSE pre-equalization transmission scheme, a THP-ZF pre-equalization transmission scheme, or a THP-MMSE pre-equalization transmission scheme.

Additionally, or alternatively, the communications manager 920 may support wireless communications at a second wireless device in accordance with examples as disclosed herein. In some examples, the capability component 925 is capable of, configured to, or operable to support a means for receiving a control message indicating a set of pre-equalization transmission schemes supported by a first wireless device for receipt of messaging pre-equalized by the second wireless device for transmission to the first wireless device. In some examples, the channel measurement component 930 is capable of, configured to, or operable to support a means for receiving a measurement report indicating a measurement of a wireless channel between the first wireless device and the second wireless device. In some examples, the pre-equalization transmission scheme component 935 is capable of, configured to, or operable to support a means for transmitting a control signal indicative of a first pre-equalization transmission scheme to be used by the second wireless device for pre-equalization based on the set of pre-equalization transmission schemes and the measurement. The pre-equalization component 945 is capable of, configured to, or operable to support a means for transmitting, via the wireless channel, one or more downlink messages pre-equalized in accordance with the first pre-equalization transmission scheme.

In some examples, the downlink waveform component 950 is capable of, configured to, or operable to support a means for transmitting, as part of the control signal, an indication of a first waveform of the one or more downlink messages, where the control signal indicates the first pre-equalization transmission scheme based on the first waveform of the one or more downlink messages.

In some examples, the channel characteristic component 955 is capable of, configured to, or operable to support a means for receiving, as part of the measurement report, an indication of a channel characteristic of the wireless channel between the first wireless device and the second wireless device, where the control signal indicates the first pre-equalization transmission scheme based on the channel characteristic.

In some examples, the pre-equalization disablement component 960 is capable of, configured to, or operable to support a means for transmitting a second control signal indicating that pre-equalization for one or more second downlink messages is disabled based on at least one of a latency associated with channel measurement reporting satisfying a latency threshold or a quantity of unsuccessful transmissions between the first wireless device and the second wireless device satisfying a quantity threshold.

In some examples, the downlink messaging component 940 is capable of, configured to, or operable to support a means for refraining from pre-equalization the one or more second downlink messages based on the second control signal.

In some examples, the power scaling component 965 is capable of, configured to, or operable to support a means for transmitting, as part of the control signal, an indication of a power scaling parameter associated with the first pre-equalization transmission scheme, where the one or more downlink messages are transmitted in accordance with the power scaling parameter.

In some examples, the pre-equalization parameter component 970 is capable of, configured to, or operable to support a means for transmitting, as part of the control signal, an indication of one or more parameters associated with the first pre-equalization transmission scheme, where the one or more downlink messages are transmitted based on the one or more parameters.

In some examples, the control signal indicates the first pre-equalization transmission scheme based on the measurement satisfying a measurement threshold, and the measurement threshold is based on one of a channel characteristic of the wireless channel between the first wireless device and the second wireless device, or a waveform of the one or more downlink messages, or both.

In some examples, the first pre-equalization transmission scheme includes at least one of a Tx-ZF pre-equalization transmission scheme, a Tx-MMSE pre-equalization transmission scheme, a THP-ZF pre-equalization transmission scheme, or a THP-MMSE pre-equalization transmission scheme.

Figure 10:
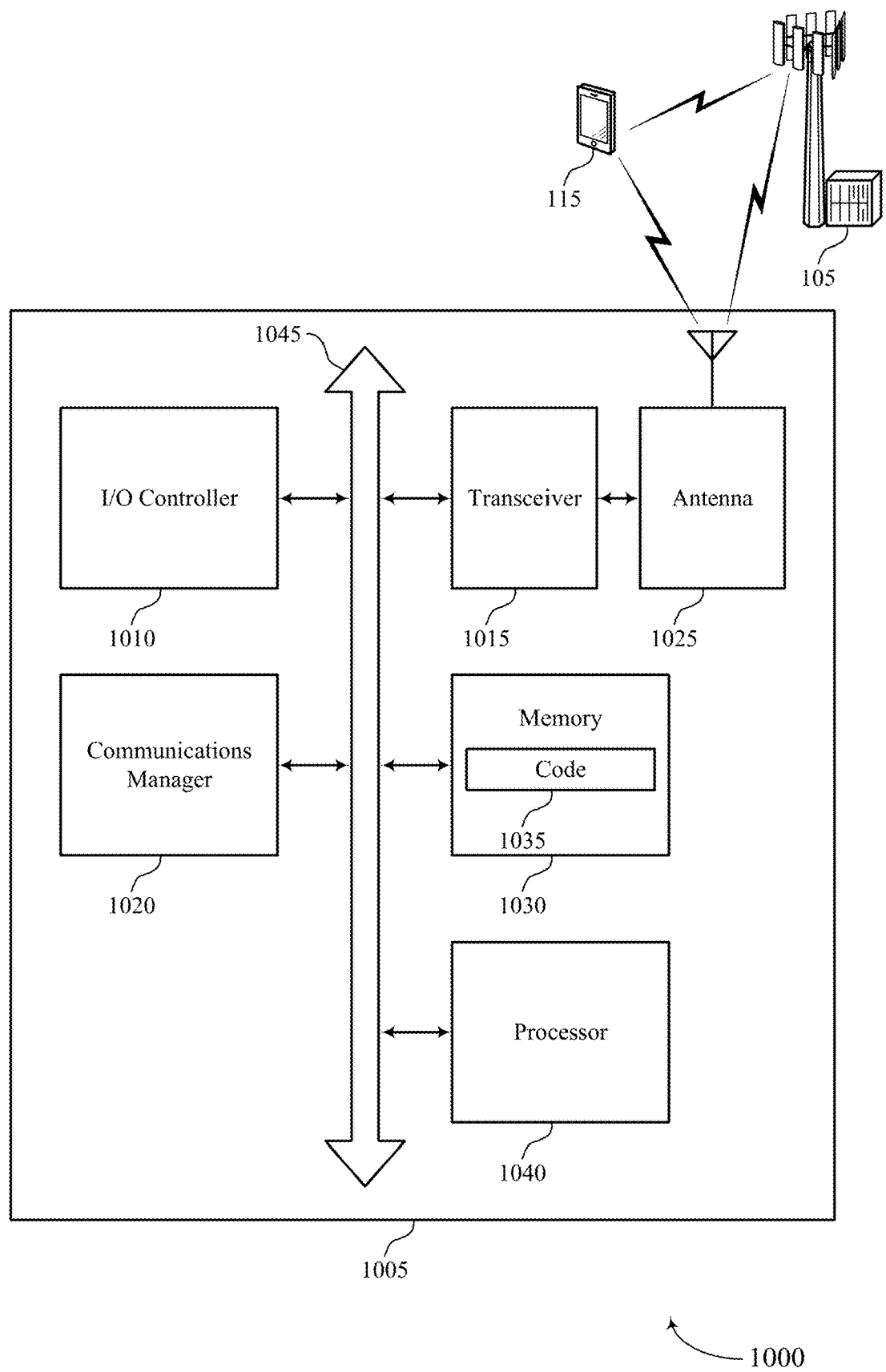
FIG. 10 shows a diagram of a system including a device that supports techniques for dynamic pre-equalization switching in accordance with one or more aspects of the present disclosure.

FIG. 10 shows a diagram of a system 1000 including a device 1005 that supports techniques for dynamic pre-equalization switching in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045). In some examples, the device 1005 may include one or more processors 1040 and one or more memories 1030 configured to perform the aspects as described herein.

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for dynamic pre-equalization switching). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first wireless device in accordance with examples as disclosed herein. For example, the communications manager 1020 is capable of, configured to, or operable to support a means for transmitting a control message indicating a set of pre-equalization transmission schemes supported by the first wireless device for receipt of messaging pre-equalized by a second wireless device for transmission to the first wireless device. The communications manager 1020 is capable of, configured to, or operable to support a means for transmitting a measurement report indicating a measurement of a wireless channel between the first wireless device and the second wireless device. The communications manager 1020 is capable of, configured to, or operable to support a means for receiving a control signal indicative of a first pre-equalization transmission scheme to be used by the second wireless device for pre-equalization based on the set of pre-equalization transmission schemes and the measurement. The communications manager 1020 is capable of, configured to, or operable to support a means for receiving, via the wireless channel, one or more downlink messages pre-equalized in accordance with the first pre-equalization transmission scheme.

Additionally, or alternatively, the communications manager 1020 may support wireless communications at a second wireless device in accordance with examples as disclosed herein. For example, the communications manager 1020 is capable of, configured to, or operable to support a means for receiving a control message indicating a set of pre-equalization transmission schemes supported by a first wireless device for receipt of messaging pre-equalized by the second wireless device for transmission to the first wireless device. The communications manager 1020 is capable of, configured to, or operable to support a means for receiving a measurement report indicating a measurement of a wireless channel between the first wireless device and the second wireless device. The communications manager 1020 is capable of, configured to, or operable to support a means for transmitting a control signal indicative of a first pre-equalization transmission scheme to be used by the second wireless device for pre-equalization based on the set of pre-equalization transmission schemes and the measurement. The communications manager 1020 is capable of, configured to, or operable to support a means for transmitting, via the wireless channel, one or more downlink messages pre-equalized in accordance with the first pre-equalization transmission scheme.

By including or configuring the communications manager 1020 in accordance with examples as described herein, the device 1005 may support techniques for a first wireless device to receive one or more downlink messages that have been pre-equalized by a second wireless device, resulting in improved user experience related to reduced processing, reduced power consumption, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for dynamic pre-equalization switching as described herein, or the processor 1040 and the memory 1030 may be otherwise configured to perform or support such operations.

Figure 11:
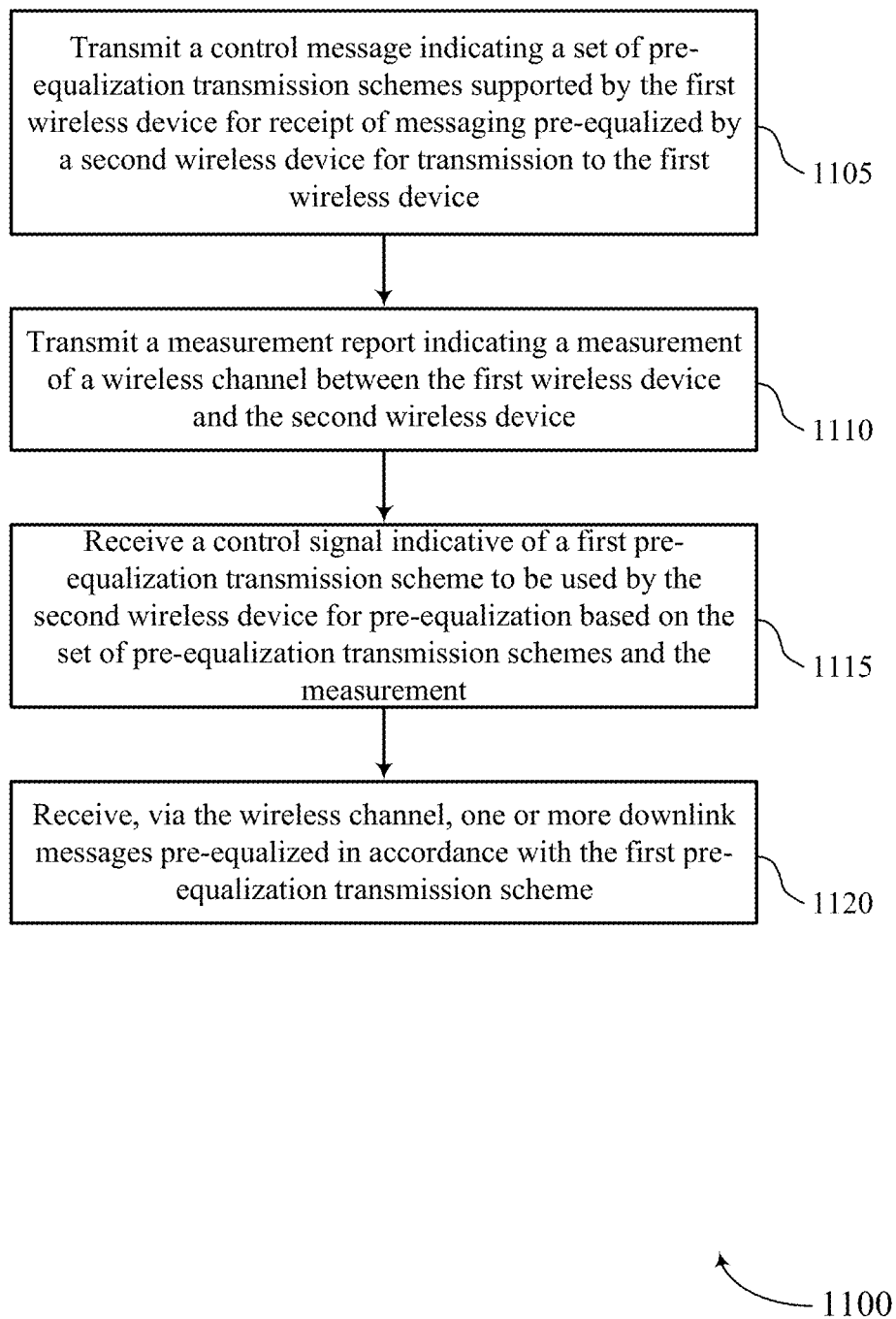
FIGS. 11 through 14 show flowcharts illustrating methods that support techniques for dynamic pre-equalization switching in accordance with one or more aspects of the present disclosure.

FIG. 11 shows a flowchart illustrating a method 1100 that supports techniques for dynamic pre-equalization switching in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1105, the method may include transmitting a control message indicating a set of pre-equalization transmission schemes supported by the first wireless device for receipt of messaging pre-equalized by a second wireless device for transmission to the first wireless device. The operations of 1105 may be performed in accordance with examples as disclosed herein. In some examples, aspects of the operations of 1105 may be performed by a capability component 925 as described with reference to FIG. 9.

At 1110, the method may include transmitting a measurement report indicating a measurement of a wireless channel between the first wireless device and the second wireless device. The operations of 1110 may be performed in accordance with examples as disclosed herein. In some examples, aspects of the operations of 1110 may be performed by a channel measurement component 930 as described with reference to FIG. 9.

At 1115, the method may include receiving a control signal indicative of a first pre-equalization transmission scheme to be used by the second wireless device for pre-equalization based on the set of pre-equalization transmission schemes and the measurement. The operations of 1115 may be performed in accordance with examples as disclosed herein. In some examples, aspects of the operations of 1115 may be performed by a pre-equalization transmission scheme component 935 as described with reference to FIG. 9.

At 1120, the method may include receiving, via the wireless channel, one or more downlink messages pre-equalized in accordance with the first pre-equalization transmission scheme. The operations of 1120 may be performed in accordance with examples as disclosed herein. In some examples, aspects of the operations of 1120 may be performed by a downlink messaging component 940 as described with reference to FIG. 9.

Figure 12:
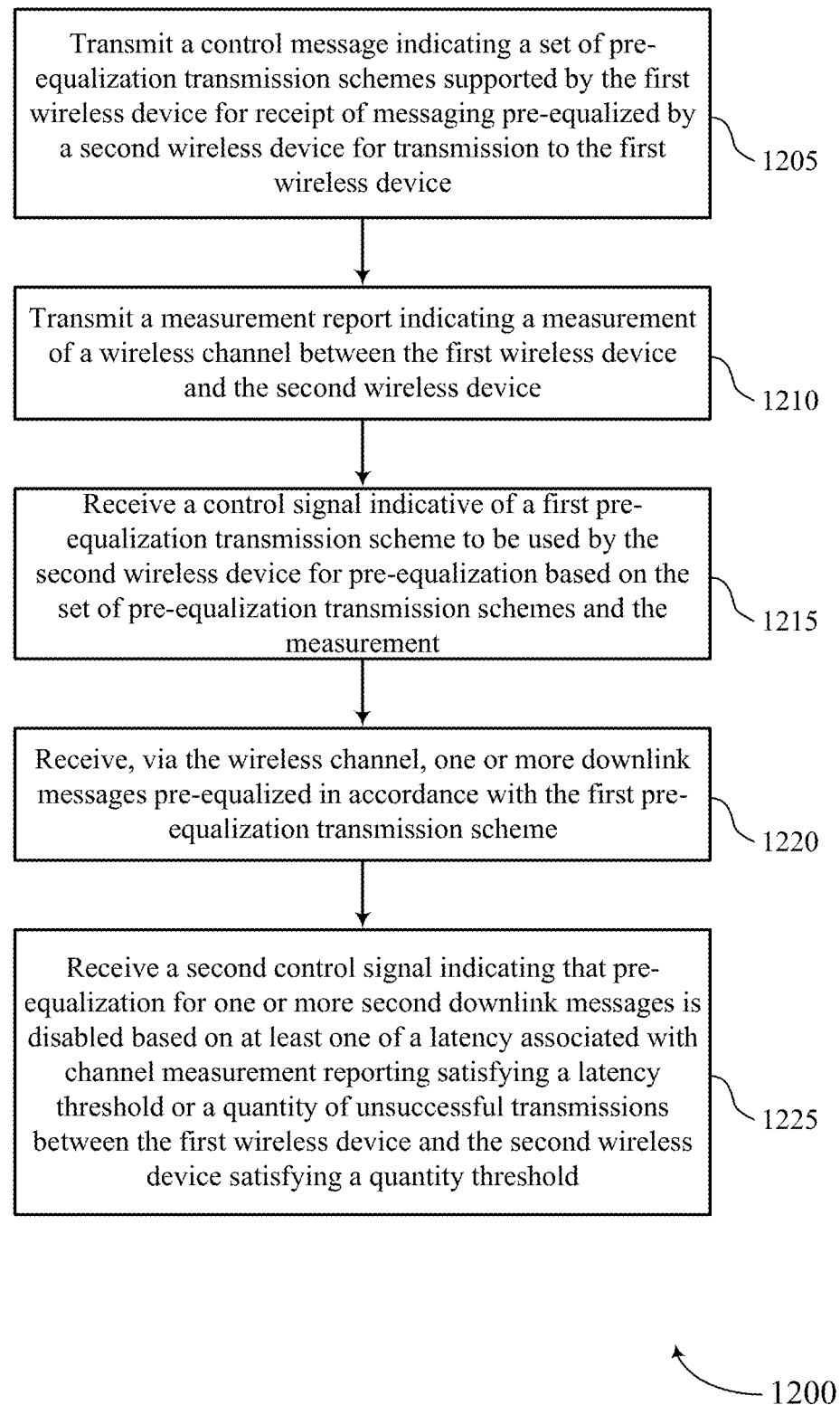

FIG. 12 shows a flowchart illustrating a method 1200 that supports techniques for dynamic pre-equalization switching in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1205, the method may include transmitting a control message indicating a set of pre-equalization transmission schemes supported by the first wireless device for receipt of messaging pre-equalized by a second wireless device for transmission to the first wireless device. The operations of 1205 may be performed in accordance with examples as disclosed herein. In some examples, aspects of the operations of 1205 may be performed by a capability component 925 as described with reference to FIG. 9.

At 1210, the method may include transmitting a measurement report indicating a measurement of a wireless channel between the first wireless device and the second wireless device. The operations of 1210 may be performed in accordance with examples as disclosed herein. In some examples, aspects of the operations of 1210 may be performed by a channel measurement component 930 as described with reference to FIG. 9.

At 1215, the method may include receiving a control signal indicative of a first pre-equalization transmission scheme to be used by the second wireless device for pre-equalization based on the set of pre-equalization transmission schemes and the measurement. The operations of 1215 may be performed in accordance with examples as disclosed herein. In some examples, aspects of the operations of 1215 may be performed by a pre-equalization transmission scheme component 935 as described with reference to FIG. 9.

At 1220, the method may include receiving, via the wireless channel, one or more downlink messages pre-equalized in accordance with the first pre-equalization transmission scheme. The operations of 1220 may be performed in accordance with examples as disclosed herein. In some examples, aspects of the operations of 1220 may be performed by a downlink messaging component 940 as described with reference to FIG. 9.

At 1225, the method may include receiving a second control signal indicating that pre-equalization for one or more second downlink messages is disabled based on at least one of a latency associated with channel measurement reporting satisfying a latency threshold or a quantity of unsuccessful transmissions between the first wireless device and the second wireless device satisfying a quantity threshold. The operations of 1225 may be performed in accordance with examples as disclosed herein. In some examples, aspects of the operations of 1225 may be performed by a pre-equalization disablement component 960 as described with reference to FIG. 9.

Figure 13:
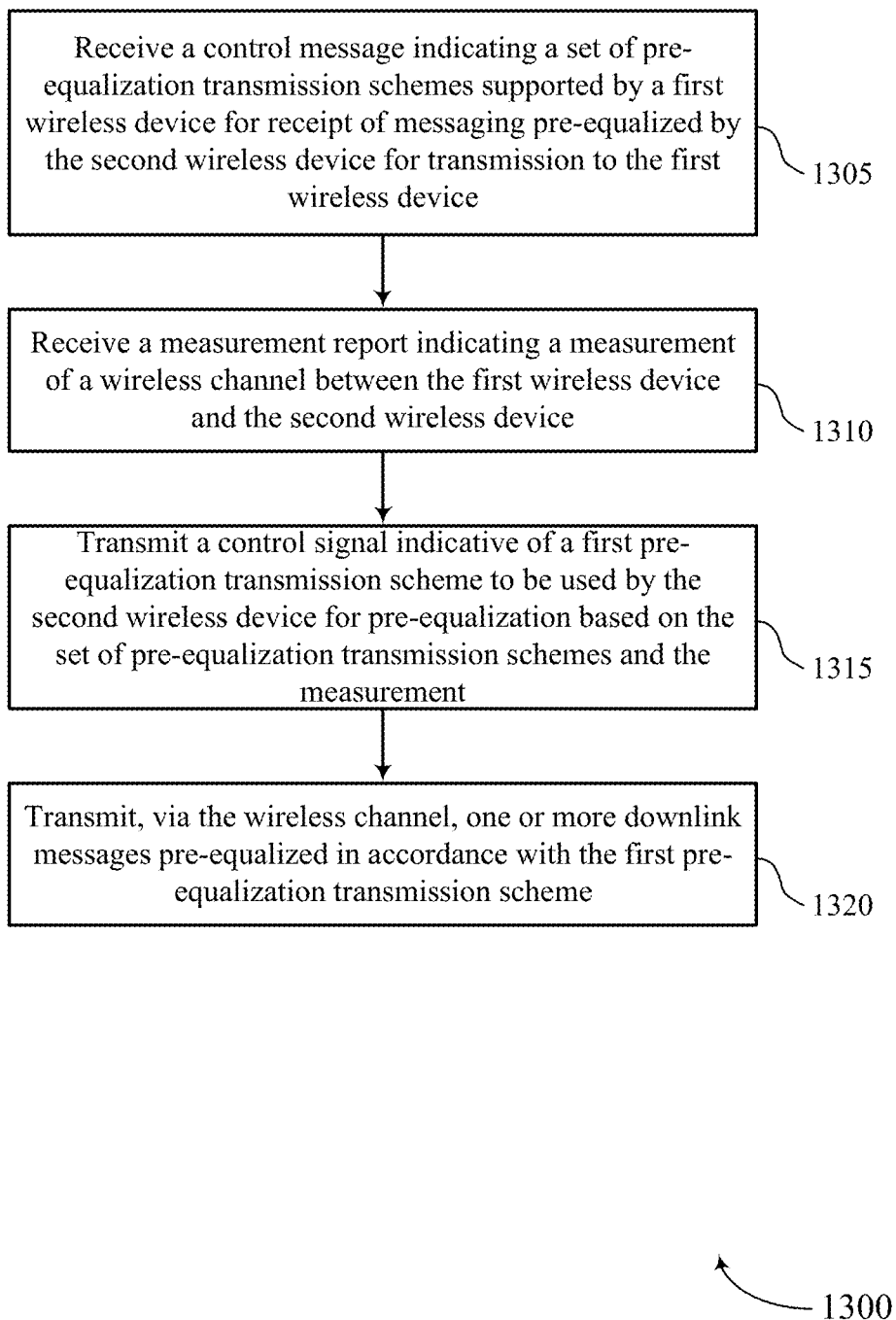

FIG. 13 shows a flowchart illustrating a method 1300 that supports techniques for dynamic pre-equalization switching in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1305, the method may include receiving a control message indicating a set of pre-equalization transmission schemes supported by a first wireless device for receipt of messaging pre-equalized by the second wireless device for transmission to the first wireless device. The operations of 1305 may be performed in accordance with examples as disclosed herein. In some examples, aspects of the operations of 1305 may be performed by a capability component 925 as described with reference to FIG. 9.

At 1310, the method may include receiving a measurement report indicating a measurement of a wireless channel between the first wireless device and the second wireless device. The operations of 1310 may be performed in accordance with examples as disclosed herein. In some examples, aspects of the operations of 1310 may be performed by a channel measurement component 930 as described with reference to FIG. 9.

At 1315, the method may include transmitting a control signal indicative of a first pre-equalization transmission scheme to be used by the second wireless device for pre-equalization based on the set of pre-equalization transmission schemes and the measurement. The operations of 1315 may be performed in accordance with examples as disclosed herein. In some examples, aspects of the operations of 1315 may be performed by a pre-equalization transmission scheme component 935 as described with reference to FIG. 9.

At 1320, the method may include transmitting, via the wireless channel, one or more downlink messages pre-equalized in accordance with the first pre-equalization transmission scheme. The operations of 1320 may be performed in accordance with examples as disclosed herein. In some examples, aspects of the operations of 1320 may be performed by a pre-equalization component 945 as described with reference to FIG. 9.

Figure 14:
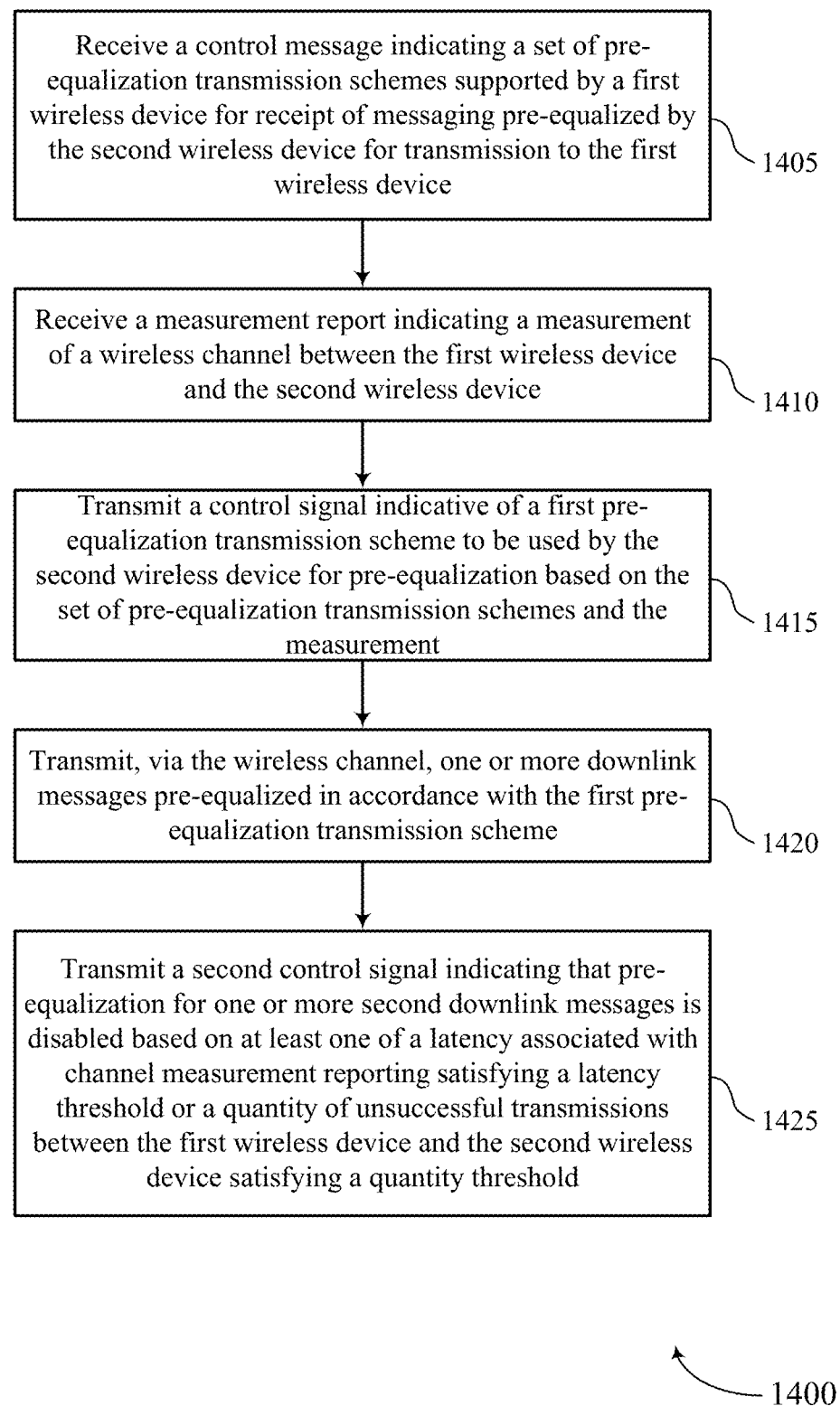

FIG. 14 shows a flowchart illustrating a method 1400 that supports techniques for dynamic pre-equalization switching in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving a control message indicating a set of pre-equalization transmission schemes supported by a first wireless device for receipt of messaging pre-equalized by the second wireless device for transmission to the first wireless device. The operations of 1405 may be performed in accordance with examples as disclosed herein. In some examples, aspects of the operations of 1405 may be performed by a capability component 925 as described with reference to FIG. 9.

At 1410, the method may include receiving a measurement report indicating a measurement of a wireless channel between the first wireless device and the second wireless device. The operations of 1410 may be performed in accordance with examples as disclosed herein. In some examples, aspects of the operations of 1410 may be performed by a channel measurement component 930 as described with reference to FIG. 9.

At 1415, the method may include transmitting a control signal indicative of a first pre-equalization transmission scheme to be used by the second wireless device for pre-equalization based on the set of pre-equalization transmission schemes and the measurement. The operations of 1415 may be performed in accordance with examples as disclosed herein. In some examples, aspects of the operations of 1415 may be performed by a pre-equalization transmission scheme component 935 as described with reference to FIG. 9.

At 1420, the method may include transmitting, via the wireless channel, one or more downlink messages pre-equalized in accordance with the first pre-equalization transmission scheme. The operations of 1420 may be performed in accordance with examples as disclosed herein. In some examples, aspects of the operations of 1420 may be performed by a pre-equalization component 945 as described with reference to FIG. 9.

At 1425, the method may include transmitting a second control signal indicating that pre-equalization for one or more second downlink messages is disabled based on at least one of a latency associated with channel measurement reporting satisfying a latency threshold or a quantity of unsuccessful transmissions between the first wireless device and the second wireless device satisfying a quantity threshold. The operations of 1425 may be performed in accordance with examples as disclosed herein. In some examples, aspects of the operations of 1425 may be performed by a pre-equalization disablement component 960 as described with reference to FIG. 9.

The following provides an overview of aspects of the present disclosure:

Aspect 1: A method for wireless communications at a first wireless device, comprising: transmitting a control message indicating a set of pre-equalization transmission schemes supported by the first wireless device for receipt of messaging pre-equalized by a second wireless device for transmission to the first wireless device; transmitting a measurement report indicating a measurement of a wireless channel between the first wireless device and the second wireless device; receiving a control signal indicative of a first pre-equalization transmission scheme to be used by the second wireless device for pre-equalization based at least in part on the set of pre-equalization transmission schemes and the measurement; and receiving, via the wireless channel, one or more downlink messages pre-equalized in accordance with the first pre-equalization transmission scheme.

Aspect 2: The method of aspect 1, further comprising: receiving, as part of the control signal, an indication of a first waveform of the one or more downlink messages, wherein the control signal indicates the first pre-equalization transmission scheme based at least in part on the first waveform of the one or more downlink messages.

Aspect 3: The method of any of aspects 1 through 2, further comprising: transmitting, as part of the measurement report, an indication of a channel characteristic of the wireless channel between the first wireless device and the second wireless device, wherein the control signal indicates the first pre-equalization transmission scheme based at least in part on the channel characteristic.

Aspect 4: The method of any of aspects 1 through 3, further comprising: receiving a second control signal indicating that pre-equalization for one or more second downlink messages is disabled based at least in part on at least one of a latency associated with channel measurement reporting satisfying a latency threshold or a quantity of unsuccessful transmissions between the first wireless device and the second wireless device satisfying a quantity threshold.

Aspect 5: The method of aspect 4, further comprising: receiving, using channel equalization, the one or more second downlink messages based at least in part on the second control signal.

Aspect 6: The method of any of aspects 1 through 5, further comprising: receiving, as part of the control signal, an indication of a power scaling parameter associated with the first pre-equalization transmission scheme, wherein the one or more downlink messages are received in accordance with the power scaling parameter.

Aspect 7: The method of any of aspects 1 through 6, further comprising: receiving, as part of the control signal, an indication of one or more parameters associated with the first pre-equalization transmission scheme, wherein the one or more downlink messages are received based at least in part on the one or more parameters.

Aspect 8: The method of any of aspects 1 through 7, wherein the control signal indicates the first pre-equalization transmission scheme based at least in part on the measurement satisfying a measurement threshold, and the measurement threshold is based at least in part on one of a channel characteristic of the wireless channel between the first wireless device and the second wireless device, or a waveform of the one or more downlink messages, or both.

Aspect 9: The method of any of aspects 1 through 8, wherein the first pre-equalization transmission scheme comprises at least one of a Tx-ZF pre-equalization scheme, a Tx-MMSE pre-equalization scheme, a THP-ZF pre-equalization scheme, or a THP-MMSE pre-equalization scheme.

Aspect 10: A method for wireless communications at a second wireless device, comprising: receiving a control message indicating a set of pre-equalization transmission schemes supported by a first wireless device for receipt of messaging pre-equalized by the second wireless device for transmission to the first wireless device; receiving a measurement report indicating a measurement of a wireless channel between the first wireless device and the second wireless device; transmitting a control signal indicative of a first pre-equalization transmission scheme to be used by the second wireless device for pre-equalization based at least in part on the set of pre-equalization transmission schemes and the measurement; and transmitting, via the wireless channel, one or more downlink messages pre-equalized in accordance with the first pre-equalization transmission scheme.

Aspect 11: The method of aspect 10, further comprising: transmitting, as part of the control signal, an indication of a first waveform of the one or more downlink messages, wherein the control signal indicates the first pre-equalization transmission scheme based at least in part on the first waveform of the one or more downlink messages.

Aspect 12: The method of any of aspects 10 through 11, further comprising: receiving, as part of the measurement report, an indication of a channel characteristic of the wireless channel between the first wireless device and the second wireless device, wherein the control signal indicates the first pre-equalization transmission scheme based at least in part on the channel characteristic.

Aspect 13: The method of any of aspects 10 through 12, further comprising: transmitting a second control signal indicating that pre-equalization for one or more second downlink messages is disabled based at least in part on at least one of a latency associated with channel measurement reporting satisfying a latency threshold or a quantity of unsuccessful transmissions between the first wireless device and the second wireless device satisfying a quantity threshold.

Aspect 14: The method of aspect 13, further comprising: refraining from pre-equalization the one or more second downlink messages based at least in part on the second control signal.

Aspect 15: The method of any of aspects 10 through 14, further comprising: transmitting, as part of the control signal, an indication of a power scaling parameter associated with the first pre-equalization transmission scheme, wherein the one or more downlink messages are transmitted in accordance with the power scaling parameter.

Aspect 16: The method of any of aspects 10 through 15, further comprising: transmitting, as part of the control signal, an indication of one or more parameters associated with the first pre-equalization transmission scheme, wherein the one or more downlink messages are transmitted based at least in part on the one or more parameters.

Aspect 17: The method of any of aspects 10 through 16, wherein the control signal indicates the first pre-equalization transmission scheme based at least in part on the measurement satisfying a measurement threshold, and the measurement threshold is based at least in part on one of a channel characteristic of the wireless channel between the first wireless device and the second wireless device, or a waveform of the one or more downlink messages, or both.

Aspect 18: The method of any of aspects 10 through 17, wherein the first pre-equalization transmission scheme comprises at least one of a Tx-ZF pre-equalization scheme, a Tx-MMSE pre-equalization scheme, a THP-ZF pre-equalization scheme, or a THP-MMSE pre-equalization scheme.

Aspect 19: An apparatus for wireless communications at a first wireless device, comprising one or more processors; one or more memories coupled with the one or more processors; and instructions stored in the one or more memories and executable by the one or more processors to cause the apparatus to perform a method of any of aspects 1 through 9.

Aspect 20: An apparatus for wireless communications at a first wireless device, comprising at least one means for performing a method of any of aspects 1 through 9.

Aspect 21: A non-transitory computer-readable medium storing code for wireless communications at a first wireless device, the code comprising instructions executable by one or more processors to perform a method of any of aspects 1 through 9.

Aspect 22: An apparatus for wireless communications at a second wireless device, comprising one or more processors; one or more memories coupled with the one or more processors; and instructions stored in the one or more memories and executable by the one or more processors to cause the apparatus to perform a method of any of aspects 10 through 18.

Aspect 23: An apparatus for wireless communications at a second wireless device, comprising at least one means for performing a method of any of aspects 10 through 18.

Aspect 24: A non-transitory computer-readable medium storing code for wireless communications at a second wireless device, the code comprising instructions executable by one or more processors to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by one or more processors, firmware, or any combination thereof. If implemented using software executed by one or more processors, the functions may be stored as or transmitted using one or more instructions or code of a computer-readable medium. Other examples and implementations are within the scope of the disclosure and appended claims. For example, due to the nature of software, functions described herein may be implemented using software executed by one or more processors, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first wireless device, comprising:
   one or more processors;
   one or more memories coupled with the one or more processors; and
   instructions stored in the one or more memories and executable by the one or more processors to cause the apparatus to:
   transmit a control message indicating a set of pre-equalization transmission schemes supported by the first wireless device for receipt of messaging pre-equalized by a second wireless device for transmission to the first wireless device;
   transmit a measurement report indicating a measurement of a wireless channel between the first wireless device and the second wireless device;
   receive a control signal indicative of a first pre-equalization transmission scheme to be used by the second wireless device for pre-equalization based at least in part on the set of pre-equalization transmission schemes and the measurement; and
   receive, via the wireless channel, one or more downlink messages pre-equalized in accordance with the first pre-equalization transmission scheme.

2. The apparatus of claim 1, wherein the instructions are further executable by the one or more processors to cause the apparatus to:
receive, as part of the control signal, an indication of a first waveform of the one or more downlink messages, wherein the control signal indicates the first pre-equalization transmission scheme based at least in part on the first waveform of the one or more downlink messages.

3. The apparatus of claim 1, wherein the instructions are further executable by the one or more processors to cause the apparatus to:
transmit, as part of the measurement report, an indication of a channel characteristic of the wireless channel between the first wireless device and the second wireless device,
wherein the control signal indicates the first pre-equalization transmission scheme based at least in part on the channel characteristic.

4. The apparatus of claim 1, wherein the instructions are further executable by the one or more processors to cause the apparatus to:
receive a second control signal indicating that pre-equalization for one or more second downlink messages is disabled based at least in part on at least one of a latency associated with channel measurement reporting satisfying a latency threshold or a quantity of unsuccessful transmissions between the first wireless device and the second wireless device satisfying a quantity threshold.

5. The apparatus of claim 4, wherein the instructions are further executable by the one or more processors to cause the apparatus to:
receive, using channel equalization, the one or more second downlink messages based at least in part on the second control signal.

6. The apparatus of claim 1, wherein the instructions are further executable by the one or more processors to cause the apparatus to:
receive, as part of the control signal, an indication of a power scaling parameter associated with the first pre-equalization transmission scheme,
wherein the instructions are executable by the one or more processors to cause the apparatus to receive the one or more downlink messages in accordance with the power scaling parameter.

7. The apparatus of claim 1, wherein the instructions are further executable by the one or more processors to cause the apparatus to:
receive, as part of the control signal, an indication of one or more parameters associated with the first pre-equalization transmission scheme,
wherein the instructions are executable by the one or more processors to cause the apparatus to receive the one or more downlink messages based at least in part on the one or more parameters.

8. The apparatus of claim 1, wherein:
the control signal indicates the first pre-equalization transmission scheme based at least in part on the measurement satisfying a measurement threshold, and
the measurement threshold is based at least in part on one of a channel characteristic of the wireless channel between the first wireless device and the second wireless device, or a waveform of the one or more downlink messages, or both.

9. The apparatus of claim 1, wherein the first pre-equalization transmission scheme comprises at least one of a transmission zero-forcing pre-equalization transmission scheme, a transmission minimum mean squared error pre-equalization transmission scheme, a Tomlinson-Harashima zero-forcing pre-equalization transmission scheme, or a Tomlinson-Harashima minimum mean squared error pre-equalization transmission scheme.

10. An apparatus for wireless communications at a second wireless device, comprising:
one or more processors;
one or more memories coupled with the one or more processors; and
instructions stored in the one or more memories and executable by the one or more processors to cause the apparatus to:
receive a control message indicating a set of pre-equalization transmission schemes supported by a first wireless device for receipt of messaging pre-equalized by the second wireless device for transmission to the first wireless device;
receive a measurement report indicating a measurement of a wireless channel between the first wireless device and the second wireless device;
transmit a control signal indicative of a first pre-equalization transmission scheme to be used by the second wireless device for pre-equalization based at least in part on the set of pre-equalization transmission schemes and the measurement; and
transmit, via the wireless channel, one or more downlink messages pre-equalized in accordance with the first pre-equalization transmission scheme.

11. The apparatus of claim 10, wherein the instructions are further executable by the one or more processors to cause the apparatus to:
transmit, as part of the control signal, an indication of a first waveform of the one or more downlink messages,
wherein the control signal indicates the first pre-equalization transmission scheme based at least in part on the first waveform of the one or more downlink messages.

12. The apparatus of claim 10, wherein the instructions are further executable by the one or more processors to cause the apparatus to:
receive, as part of the measurement report, an indication of a channel characteristic of the wireless channel between the first wireless device and the second wireless device,
wherein the control signal indicates the first pre-equalization transmission scheme based at least in part on the channel characteristic.

13. The apparatus of claim 10, wherein the instructions are further executable by the one or more processors to cause the apparatus to:
transmit a second control signal indicating that pre-equalization for one or more second downlink messages is disabled based at least in part on at least one of a latency associated with channel measurement reporting satisfying a latency threshold or a quantity of unsuccessful transmissions between the first wireless device and the second wireless device satisfying a quantity threshold.

14. The apparatus of claim 13, wherein the instructions are further executable by the one or more processors to cause the apparatus to:
refrain from pre-equalizing the one or more second downlink messages based at least in part on the second control signal.

15. The apparatus of claim 10, wherein the instructions are further executable by the one or more processors to cause the apparatus to:

transmit, as part of the control signal, an indication of a power scaling parameter associated with the first pre-equalization transmission scheme,
wherein the instructions are executable by the one or more processors to cause the apparatus to transmit the one or more downlink messages in accordance with the power scaling parameter.

16. The apparatus of claim 10, wherein the instructions are further executable by the one or more processors to cause the apparatus to:
transmit, as part of the control signal, an indication of one or more parameters associated with the first pre-equalization transmission scheme,
wherein the instructions are executable by the one or more processors to cause the apparatus to transmit the one or more downlink messages based at least in part on the one or more parameters.

17. The apparatus of claim 10, wherein:
the control signal indicates the first pre-equalization transmission scheme based at least in part on the measurement satisfying a measurement threshold, and
the measurement threshold is based at least in part on one of a channel characteristic of the wireless channel between the first wireless device and the second wireless device, or a waveform of the one or more downlink messages, or both.

18. The apparatus of claim 10, wherein the first pre-equalization transmission scheme comprises at least one of a transmission zero-forcing pre-equalization transmission scheme, a transmission minimum mean squared error pre-equalization transmission scheme, a Tomlinson-Harashima zero-forcing pre-equalization transmission scheme, or a Tomlinson-Harashima minimum mean squared error pre-equalization transmission scheme.

19. A method for wireless communications at a first wireless device, comprising:
transmitting a control message indicating a set of pre-equalization transmission schemes supported by the first wireless device for receipt of messaging pre-equalized by a second wireless device for transmission to the first wireless device;
transmitting a measurement report indicating a measurement of a wireless channel between the first wireless device and the second wireless device;
receiving a control signal indicative of a first pre-equalization transmission scheme to be used by the second wireless device for pre-equalization based at least in part on the set of pre-equalization transmission schemes and the measurement; and
receiving, via the wireless channel, one or more downlink messages pre-equalized in accordance with the first pre-equalization transmission scheme.

20. The method of claim 19, further comprising:
receiving, as part of the control signal, an indication of a first waveform of the one or more downlink messages,
wherein the control signal indicates the first pre-equalization transmission scheme based at least in part on the first waveform of the one or more downlink messages.

21. The method of claim 19, further comprising:
transmitting, as part of the measurement report, an indication of a channel characteristic of the wireless channel between the first wireless device and the second wireless device,
wherein the control signal indicates the first pre-equalization transmission scheme based at least in part on the channel characteristic.

22. The method of claim 19, further comprising:
receiving a second control signal indicating that pre-equalization for one or more second downlink messages is disabled based at least in part on at least one of a latency associated with channel measurement reporting satisfying a latency threshold or a quantity of unsuccessful transmissions between the first wireless device and the second wireless device satisfying a quantity threshold.

23. The method of claim 22, further comprising:
receiving, using channel equalization, the one or more second downlink messages based at least in part on the second control signal.

24. The method of claim 19, further comprising:
receiving, as part of the control signal, an indication of a power scaling parameter associated with the first pre-equalization transmission scheme,
wherein the one or more downlink messages are received in accordance with the power scaling parameter.

25. The method of claim 19, further comprising:
receiving, as part of the control signal, an indication of one or more parameters associated with the first pre-equalization transmission scheme,
wherein the one or more downlink messages are received based at least in part on the one or more parameters.

26. The method of claim 19, wherein:
the control signal indicates the first pre-equalization transmission scheme based at least in part on the measurement satisfying a measurement threshold, and
the measurement threshold is based at least in part on one of a channel characteristic of the wireless channel between the first wireless device and the second wireless device, or a waveform of the one or more downlink messages, or both.

27. The method of claim 19, wherein the first pre-equalization transmission scheme comprises at least one of a transmission zero-forcing pre-equalization transmission scheme, a transmission minimum mean squared error pre-equalization transmission scheme, a Tomlinson-Harashima zero-forcing pre-equalization transmission scheme, or a Tomlinson-Harashima minimum mean squared error pre-equalization transmission scheme.

28. A method for wireless communications at a second wireless device, comprising:
receiving a control message indicating a set of pre-equalization transmission schemes supported by a first wireless device for receipt of messaging pre-equalized by the second wireless device for transmission to the first wireless device;
receiving a measurement report indicating a measurement of a wireless channel between the first wireless device and the second wireless device;
transmitting a control signal indicative of a first pre-equalization transmission scheme to be used by the second wireless device for pre-equalization based at least in part on the set of pre-equalization transmission schemes and the measurement; and
transmitting, via the wireless channel, one or more downlink messages pre-equalized in accordance with the first pre-equalization transmission scheme.

29. The method of claim 28, further comprising:
transmitting, as part of the control signal, an indication of a first waveform of the one or more downlink messages,
wherein the control signal indicates the first pre-equalization transmission scheme based at least in part on the first waveform of the one or more downlink messages.

30. The method of claim 28, further comprising:
receiving, as part of the measurement report, an indication of a channel characteristic of the wireless channel between the first wireless device and the second wireless device,
wherein the control signal indicates the first pre-equalization transmission scheme based at least in part on the channel characteristic.

\* \* \* \* \*